(12) United States Patent
Shin et al.

(10) Patent No.: US 7,682,284 B2
(45) Date of Patent: Mar. 23, 2010

(54) OIL PRESSURE CONTROL SYSTEM OF AUTOMATIC TRANSMISSION

(75) Inventors: Byung Kwan Shin, Suwon-si (KR); Jin Mo Park, Kwachun-si (KR); Jong Sool Park, Suwon-si (KR); Hyeog June Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 576 days.

(21) Appl. No.: 11/591,795

(22) Filed: Nov. 2, 2006

(65) Prior Publication Data

US 2007/0149355 A1   Jun. 28, 2007

(30) Foreign Application Priority Data

Dec. 12, 2005   (KR) .................... 10-2005-0121856

(51) Int. Cl.
F16H 61/26 (2006.01)
(52) U.S. Cl. ..................................... 477/130
(58) Field of Classification Search ............. 477/127, 477/128, 129, 130, 131, 143; 475/127, 128, 475/288, 284, 285
See application file for complete search history.

(56) References Cited

U.S. PATENT DOCUMENTS

| | | | | |
|---|---|---|---|---|
| 5,643,125 A | * | 7/1997 | Long et al. ................. | 475/127 |
| 5,913,916 A | * | 6/1999 | Bai et al. ..................... | 701/59 |
| 6,270,444 B1 | * | 8/2001 | Tsutsui et al. ............... | 477/143 |
| 6,520,881 B1 | * | 2/2003 | Long et al. .................. | 475/119 |
| 6,572,507 B1 | * | 6/2003 | Korkmaz et al. ............ | 475/276 |
| 6,840,885 B2 | * | 1/2005 | Yi et al. ...................... | 475/276 |
| 6,935,984 B2 | * | 8/2005 | Tiesler et al. ............... | 475/276 |
| 6,997,845 B2 | * | 2/2006 | Tiesler et al. ............... | 475/278 |
| 7,179,191 B2 | * | 2/2007 | Diosi et al. ................. | 475/276 |

* cited by examiner

*Primary Examiner*—Roger Pang
(74) *Attorney, Agent, or Firm*—Morgan, Lewis & Bockius LLP

(57) ABSTRACT

An automatic transmission includes six forward speeds and a reverse speed and includes first and second clutches, first, second, and third brakes, and first, second, and third planetary gear sets. An oil pressure control system of the transmission includes a first clutch and second brake controller allowing the first clutch to receive a fastening pressure in fourth, fifth, and sixth speeds, allowing the second brake to receive a fastening pressure in first speed and reverse, and allowing an operation state of the first clutch to be sustained upon operation of the first clutch; a second clutch controller allowing the second clutch to receive a fastening pressure in third and fifth speeds and reverse; a first brake controller allowing the first brake to receive a fastening pressure in second and sixth speeds; and a third brake controller allowing the third brake to receive a fastening pressure in first through fourth speeds.

36 Claims, 15 Drawing Sheets

|  | C1 | C2 | B1 | B2 | B3 | F1 |
|---|---|---|---|---|---|---|
| LOW |  |  |  |  | ● |  |
| One range |  |  |  | ● | ● | ● |
| Two range |  |  | ● |  | ● |  |
| Three range |  | ● |  |  | ● |  |
| Four range | ● |  |  |  | ● |  |
| Five range | ● | ● |  |  |  |  |
| Six range | ● |  |  | ● |  |  |
| R range |  | ● |  | ● |  |  |

● Operation

Fig. 8

|      | SOL-A | SOL-B | VFS-A | VFS-B | VFS-C | VFS-D |
|------|-------|-------|-------|-------|-------|-------|
| N.P  |       |       | ○     | ○     |       | ○     |
| 1ST  |       |       | ○     |       |       | ○     |
| 2ND  |       |       | ○     |       | ○     | ○     |
| 3RD  |       | ○     | ○     |       |       |       |
| 4TH  |       |       |       |       |       | ○     |
| 5TH  |       | ○     |       | ○     |       |       |
| 6TH  |       |       |       | ○     | ○     | ○     |
| LOW  | ○     |       |       |       |       | ○     |
| REV  |       |       |       | ○     |       |       |

○ : conducting

OIL PRESSURE CONTROL SYSTEM OF AUTOMATIC TRANSMISSION

CROSS-REFERENCE TO RELATED APPLICATION

This application claims priority to and the benefit of Korean Patent Application No. 10-2005-0121856 filed in the Korean Intellectual Property Office on Dec. 12, 2005, the entire contents of which are incorporated herein by reference.

BACKGROUND OF THE INVENTION

1. Field of the Invention

The present invention relates to an oil pressure control system of a six speed automatic transmission which has six forward speeds, a low range, and a reverse speed, and includes three planetary gear sets, two clutches, three brakes, and one one-way clutch.

2. Description of the Background Art

In general, an automatic transmission changes power generated in an engine by using oil pressure to obtain a proper rotation force depending on driving conditions. A typical automatic transmission includes a torque converter, a power train connected to the torque converter, and an oil pressure control system controlling the power train with an oil pressure.

The power train of the automatic transmission includes a planetary gear set which receives power of an engine, changes the power to a proper rotation force, and outputs the force; and a fastening element such as a clutch or a brake which fixes each of rotation elements of the planetary gear set or prevents rotation thereof, or which rotates by power of an engine.

Automatic transmissions typically have either four or five speeds. However, recently, in order to increase gas mileage and performance, six speed automatic transmissions have been developed.

SUMMARY OF THE INVENTION

An object of the present invention is to provide an oil pressure control system of a six speed automatic transmission with a fail-safe mode, set to a specific shift range depending on driving conditions.

Embodiments of the present invention provide an oil pressure control system of a six speed transmission that includes first and second clutches, first, second, and third brakes, and a first, second, and third simple planetary gear set. The oil pressure control system includes: a first clutch and second brake controller allowing the first clutch to receive a fastening pressure of the first clutch in fourth, fifth, and sixth speeds, allowing a second brake to receive a fastening pressure of the second brake in first speed and reverse, and allowing an operation state of the first clutch by a fastening pressure of the first clutch to sustain upon an operation of the first clutch; a second clutch controller allowing the second clutch to receive a fastening pressure of the second clutch in third and fifth speeds and reverse; a first brake controller allowing the first brake to receive a fastening pressure of the first brake in second and sixth speeds; and third brake controller allowing the third brake to receive a fastening pressure of the third brake in first, second, third, and fourth speeds.

DESCRIPTION OF THE DRAWINGS

The invention will be described in detail with reference to the following drawings in which like numerals refer to like elements.

FIG. 8 is a diagram illustrating a conducting state for each shift range of a solenoid valve;

DETAILED DESCRIPTION OF PREFERRED EMBODIMENTS

Hereinafter, exemplary embodiments of the present invention will be described in detail with reference to the accompanying drawings.

Figures 1, 2:
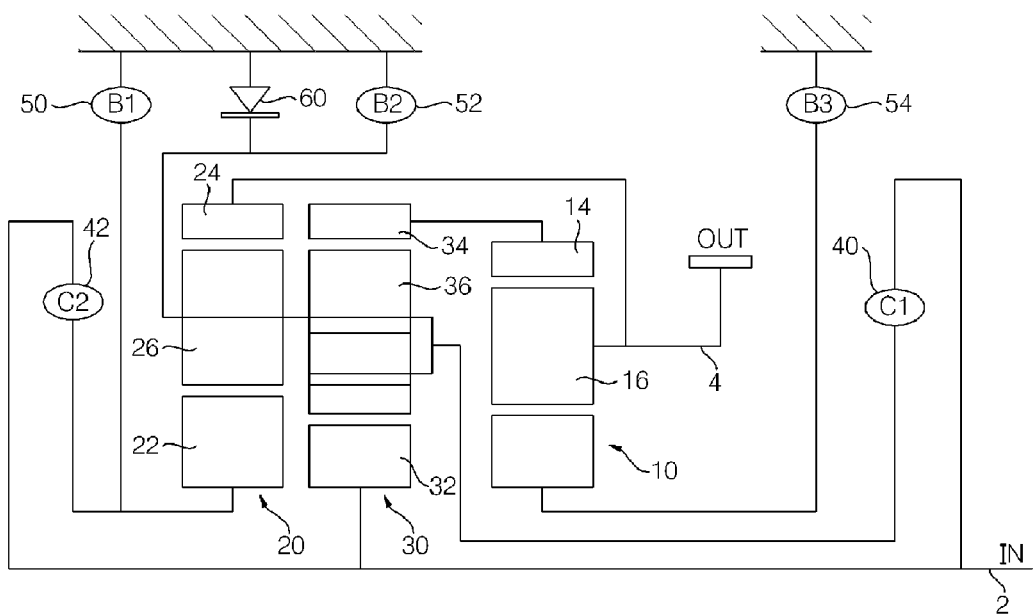
FIG. 1 is a schematic diagram illustrating an embodiment of a power train of a six speed automatic transmission to which the present invention is applied.
FIG. 2 is a table of connection elements for each shift range.

A power train of a six speed automatic transmission according to exemplary embodiments of the present invention as shown in FIGS. 1 and 2 includes a supply shaft 2 which delivers power of an engine, an output shaft 4 which outputs power shifted in the power train, first, second, and third simple planetary gear sets 10, 20, and 30 delivering power to the output shaft by shifting power of the engine delivered through the supply shaft 2, first and second clutches 40 and 42 (C1 and C2) allowing each operation element of the first, second, and third simple planetary gear sets 10, 20, and 30 to stop operation, prevent rotation, or rotate, first, second, and third brakes 50, 52, and 54 (B1, B2, and B3), and one one-way clutch 60 (F1).

The first simple planetary gear set 10 includes a first sun gear 12 connected to the third brake 54, a first ring gear 14 connected to the second simple planetary gear set 20, and a first pinion gear 16 interposed between the first ring gear 14 and the first sun gear 12 and connected to the output shaft 4.

The second simple planetary gear set 20 includes a second sun gear 22 connected to the supply shaft 2 through the second clutch 42 and connected to the first brake 50, a second ring gear 24 connected to the output shaft 4, and a second pinion gear 26 interposed between the second ring gear 24 and the second sun gear 22 connected to the second brake 52 and the one way clutch 60.

The third simple planetary gear set 30 includes a third sun gear 32 connected to the supply shaft 2, a third ring gear 34 connected to the first ring gear 14 of the first simple planetary gear set 10, a third pinion gear 36 interposed between the third ring gear 34 and the third sun gear 32 and connected to the second brake 52 and the one way clutch 60.

An operation of each shift range according to an exemplary embodiment of the present invention is as follows: In first speed, a shift is performed while the third brake 54, the second brake 52, and the one way clutch 60 operate. In second speed, a shift is performed while the first and third brakes 50 and 54 operate. In third speed, a shift is performed while the second clutch 42 and the third brakes 54 operate. In fourth speed, a shift is performed while the first clutch 40 and the third brakes 54 operate. In fifth speed, a shift is performed while the first and second clutches 40 and 42 operate. In sixth speed, a shift is performed while the first clutch 40 and the first brakes 50 operate. In a low shift range, a shift is performed while the second and third brakes 52 and 54 operate. This allows an engine brake operation. In reverse, a shift is performed while the second clutch 42 and the second brake 52 operate.

Figure 3:
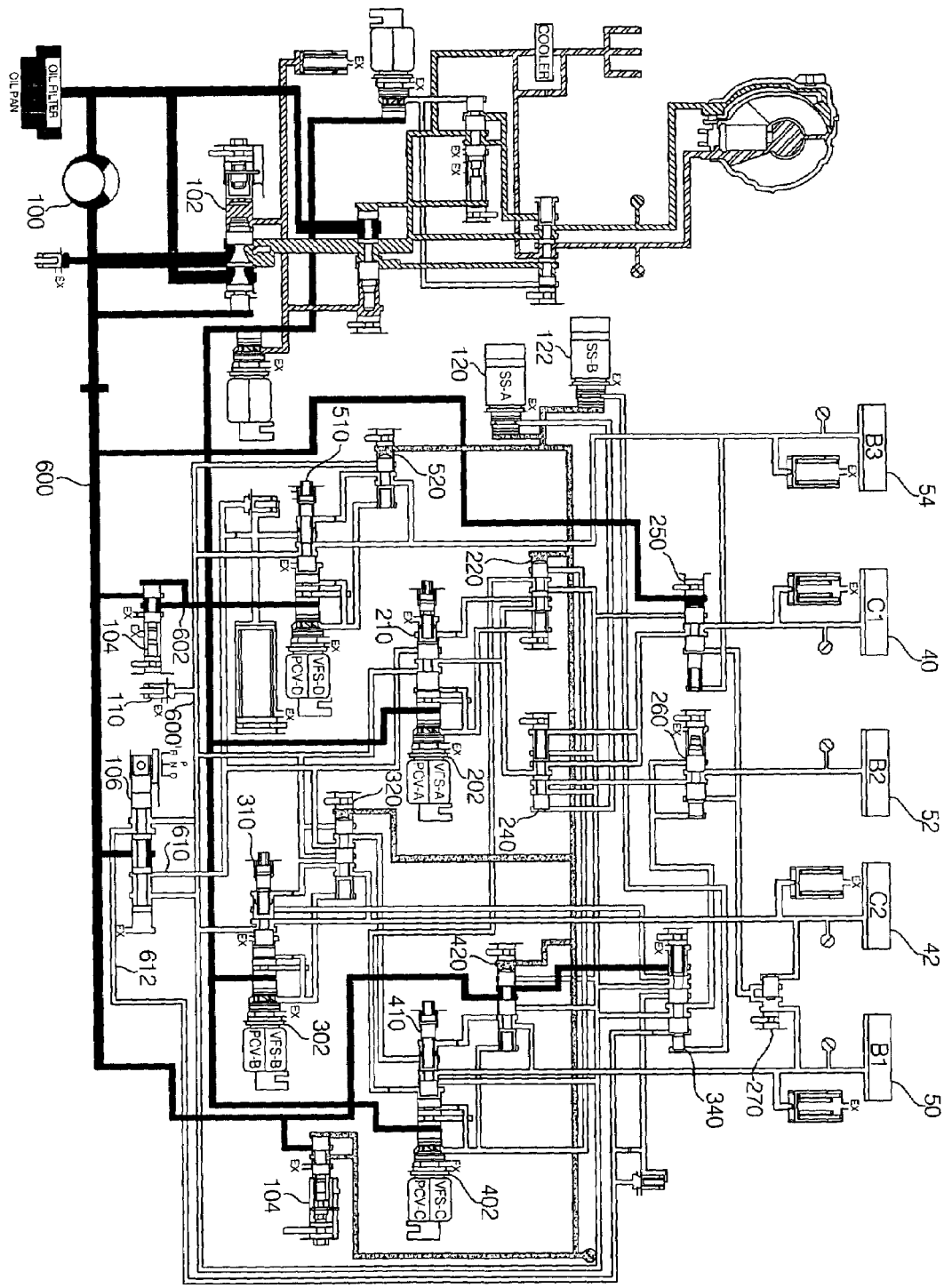
FIG. 3 is a circuit diagram of an oil pressure in neutral and park.

An oil pressure control system of a six speed automatic transmission according to embodiments of the present invention, as shown in FIG. 3, includes an oil pressure forming unit for supplying the required oil pressure to the first and second clutches 40 and 42 and the first, second, and third brakes 50, 52, and 54; a first clutch and second brake controller 200 for controlling the first clutch 40 and the second brake 52, a second clutch controller 300 for controlling the second clutch 42, a first brake controller 400 for controlling the first brake 50, and a third brake controller 500 for controlling the third brake 54.

The oil pressure forming unit includes a regulator valve 102, which adjusts oil pressure generated in an oil pump 100 to a fixed oil pressure, i.e. a line pressure, two reducing valves 104 which decompress the line pressure adjusted by the regulator valve 102, and a manual valve 106 which switches an oil path depending on each manual shift. The regulator valve 102 is connected to a line pressure oil path 600 delivering a line pressure. The reducing valve 104 is connected to the a line pressure oil path 600 for receiving a line pressure, and to a reducing decompression line 602 for delivering decompression of the reducing valve decompressed in the reducing valve 104. The manual valve 106 switches an oil path depending on manual shift to drive (D), reverse (R), and park/neutral (P/N).

The manual valve 106 allows the line pressure oil path 600 to connect to a forward range pressure line 610 connected to the forward range pressure output port of the manual valve 106, and allows a reverse range pressure line 612 connected to a reverse range pressure output port of the manual valve 106 to connect to a discharge line 600' in order to release a reverse range pressure of the manual valve 106 upon shifting to drive (D).

Otherwise, the manual valve 106 allows the line pressure oil path 600 to connect to the reverse range pressure line 612 and allows the forward range pressure line 610 to connect to the discharge line 600' in order to release a forward range pressure of the manual valve 106, upon shifting to reverse.

Otherwise, the manual valve 106 allows both the forward range pressure line 610 and the reverse range pressure line 612 to connect to the discharge line 600' in order to release both a forward range pressure and a reverse range pressure of the manual valve 106, upon shifting to park or neutral (P/N).

Figure 4:
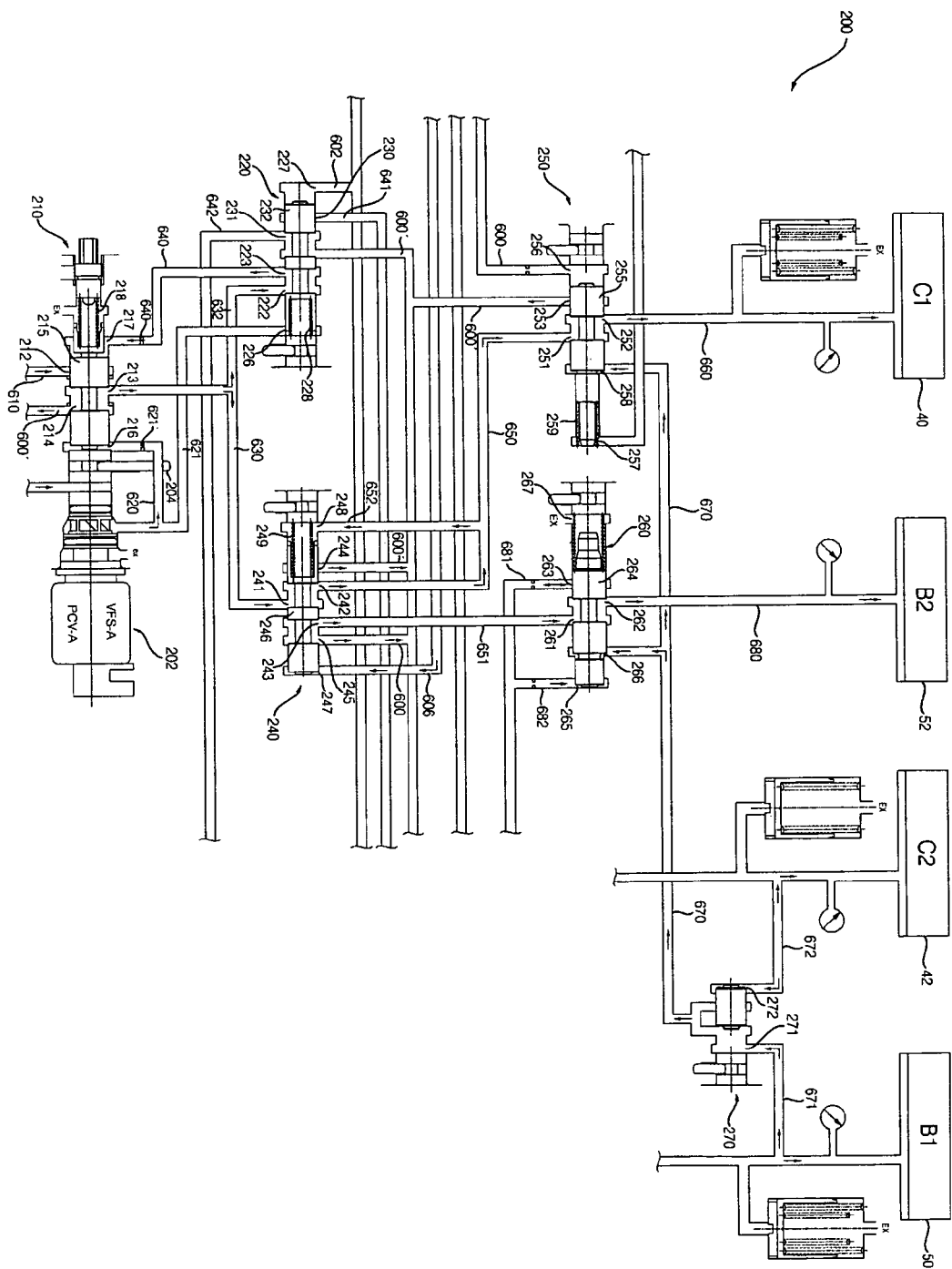
FIG. 4 is a diagram illustrating a first clutch and second brake controller.

Here, the discharge line 600' may be directly connected to the outside and, referring to FIG. 4, it can be connected to a residual pressure discharge valve 110 so that a residual pressure remains in the discharge line 600'.

The first clutch and second brake controller 200 includes a first pressure control valve 210 (PCV-A) controlled by a first proportional control solenoid valve 202 (VFS-A), a first pressure switching valve 220, and a first, second, and third switch valves 240, 250, and 260. The first clutch and second brake controller 200 allows the first clutch 40 to receive a fastening pressure of the first clutch 40 and operate in fourth, fifth, and sixth speeds and allows the second brake 52 to receive a fastening pressure of the second brake 52 and operate upon low shifting or backward driving.

After receiving reducing decompression of the reducing valve and forming a proper control pressure, the first proportional control solenoid valve 202 outputs a control pressure to the first pressure control valve 210 and the first pressure switching valve 220.

That is, the first proportional control solenoid valve 202 is connected to the reducing valve through the reducing decompression line 602 and to the first pressure control valve 210 and the first pressure switching valve 220 through first and second output lines 620 and 621. An orifice 621' is provided in the first output line 620.

Such a first proportional control solenoid valve 202 may be a normally high type which outputs a maximum control pressure at power off.

The first proportional control solenoid valve 202 receives power in first, second, and third speeds, neutral, and park, and is in a power off state to operate the first pressure control valve 210 in fourth, fifth, and sixth speeds, low shift, and reverse.

The first proportional control solenoid valve 202 and the first pressure control valve 210 can be provided in a one body structure which is divided from the first pressure control valve 210 by the first plug 204.

The first pressure control valve 210 controls a fastening pressure of the first clutch 40 and the second brake 52 by a control pressure of the first proportional control solenoid valve 202. In addition, the first pressure control valve 210 is controlled by a feedback of a fastening pressure of the first clutch 40 and the second brake 52 controlled in the first pressure control valve 210.

The first pressure control valve 210 includes three input ports 212 for inputting a D range pressure of the manual valve, an output port 213 for outputting a fastening pressure of the first clutch 40 and the second brake 52, a discharge port 214 for discharging a fastening pressure of the first clutch 40 and the second brake 52 outputted from the first pressure control valve 210, and a valve spool 215 allowing the output port 213 to be selectively connected to the input port 212 or the discharge port 214.

The input port 212 of the first pressure control valve 210 is connected to the manual valve through the forward range pressure line 610.

The output port 213 of the first pressure control valve 210 is connected to the output line 630 of the first pressure control valve 210. The output line 630 of the first pressure control valve 210 is connected to a bypass output line 632 of the first pressure control valve 210 for connection with the first pressure switching valve 220.

The discharge port 214 of the first pressure control valve 210 is connected to the discharge line 600' to pass through the residual pressure discharge valve.

The valve spool 215 of the first pressure control valve 210 moves in a horizontal direction depending on a force equilibrium relation of a control pressure operation unit of the first pressure control valve 210.

The control pressure operation unit of the first pressure control valve 210 includes a first control pressure port 216 positioned in a right side of the valve spool 215 of the first pressure control valve 210 to input a control pressure of the first proportional control solenoid valve 202 and a second control pressure port 217 positioned in a left side of the valve spool 215 of the first pressure control valve 210 to input an output pressure of the first pressure switching valve 220, and a return spring 218 elastically deformed in a moving direction of the valve spool 215 of the first pressure control valve 210.

The first control pressure port 216 of the first pressure control valve 210 is connected to a second output line 621.

A second control pressure port 217 of the first pressure control valve 210 is connected to the reducing valve through a reducing decompression line 602.

The first pressure switching valve 220 allows a fastening pressure of the first clutch 40 and the second brake 52 controlled in the first pressure control valve 210 to be fed back to the first pressure control valve 210.

The first pressure switching valve 220 includes an input port 222 for inputting a fastening pressure of the first clutch 40 and the second brake 52, which is outputted from the first pressure control valve 210; an output port 223 for feeding back the fastening pressure of the first clutch 40 and the second brake 52 inputted to the first pressure switching valve 220 to the first pressure control valve 210; a discharge port 224 for discharging the fastening pressure of the first clutch 40 and the second brake 52 fed back to the first pressure control valve 210; and a valve spool 225 for connecting the output port 223 to the input port 222 or the discharge port 224.

The input port 222 of the first pressure switching valve 220 is connected to a bypass output line 632 of the first pressure control valve 210.

The output port 223 of the first pressure switching valve 220 is connected to the second control pressure port 217 of the first pressure control valve 210 through an output line 640 of the first pressure switching valve 220. An orifice 640' is provided in the output line 640 of the first pressure switching valve 220.

The discharge port 224 of the first pressure switching valve 220 is connected to the discharge line 600' to pass through the residual pressure discharge valve.

A valve spool 225 of the second pressure switching valve 220 moves in a horizontal direction depending on a force equilibrium relation of a control pressure operation unit of the first pressure switching valve 220.

That is, the control pressure operation unit of the first pressure switching valve 220 includes a first control pressure port 226 positioned in a right side of the valve spool 225 of the first pressure switching valve 220 to input a control pressure of the first proportional control solenoid valve 202, a return spring 228 elastically deformed in a moving direction of the first pressure switching valve 220, and a second control pressure port 227 positioned in a left side of the valve spool 225 of the first pressure switching valve 220 to input decompression of the reducing valve.

In addition, the first pressure switching valve 220 further includes a feedback input port 230 for inputting a control pressure of the first brake controller 400, a feedback output port 231 for feeding back a control pressure of the first brake controller 400 inputted through the feedback input port 230 to the first brake controller 400, and a first brake controller-feedback valve spool 232 for selectively connecting the feedback input port 230 to the feedback output port 231 depending on a force equilibrium relation between a control pressure of the first proportional control solenoid valve 202, decompression of the reducing valve, and a return spring 228 of the first pressure switching valve 220.

The feedback input port 230 of the first pressure switching valve 220 is connected to the first brake controller 400 through a feedback input line 641 of the first pressure switching valve 220.

The feedback output port 231 of the first pressure switching valve 220 is connected to the first brake controller 400 through a feedback output line 642 of the first pressure switching valve 220. In the feedback output line 642 of the first pressure switching valve 220, an orifice (not shown) is provided near the first brake controller 400.

The first brake controller feedback valve spool 232 of the first pressure switching valve 220 may be a one body that interlocks with a valve spool 225 of the first pressure switching valve 220.

The first switch valve 240 allows a fastening pressure of the first clutch 40 and second brake 52 to be supplied to the first clutch 40 and the second brake 52 depending on an output pressure of the first solenoid valve 120 (SS-A) and a fastening pressure of the first clutch 40 and the second brake 52 supplied to the first clutch 40. The first solenoid valve 120 may be a normally low type which does not output an pressure of the first solenoid valve 120 at power off.

In addition, the first switch valve 240 allows a fastening pressure of the first clutch 40 and the second brake 52 to be unconditionally supplied to the first clutch 40 by means of the fastening pressure of the first clutch 40 and the second brake 52 supplied to the first clutch 40 when the first clutch 40 is fastened.

That is, the first switch valve 240 includes an input port 241 for inputting a fastening pressure of first clutch 40 and the second brake 52 outputted from the first pressure control valve 210, a first output port 242 for outputting the fastening pressure of first clutch 40 and the second brake 52 inputted to the first switch valve 240 to the second switch valve 250, a second output port 243 for outputting the fastening pressure of the first clutch 40 and the second brake 52 inputted to the first switch valve 240 to the third switch valve 260, a first discharge port 244 for discharging the fastening pressure of first clutch 40 and the second brake 52 outputted to the second switch valve 250, a second discharge port 245 for discharging the fastening pressure of first clutch 40 and the second brake 52 outputted to the third switch valve 260, and a valve spool 246 for selectively connecting the input port 241 to the first output port 242 or the second output port 243 and connecting the output port 242 or 243 which does not connect to the output port 241 to the first discharge port 244 or the second discharge port 245.

The input port 241 of the first switch valve 240 is connected to the output line 630 of the first pressure control valve 210.

The first output port 242 of the first switch valve 240 is connected to the first output line 650 of the first switch valve 240 and the second switch valve 250.

The second output port 243 of the first switch valve 240 is connected to the second output line 651 of the first switch valve 240 and the third switch valve 260.

The first discharge port 244 of the first switch valve 240 is connected to the discharge line 600' to pass through the residual pressure discharge valve.

The second discharge port 245 of the first switch valve 240 is connected to the discharge line 600' to pass through the residual pressure discharge valve.

The valve spool 246 of the first switch valve 240 moves in a horizontal direction depending on a force equilibrium relation of a control pressure operation unit of the first switch valve 240.

That is, the control pressure operation unit of the first switch valve 240 includes a first control pressure port 247 positioned in a right side of the valve spool 246 of the first switch valve 240 to input a output pressure of the first solenoid valve 120, a second control pressure port 248 positioned in a left side of the valve spool 246 of the first switch valve 240 to input by feeding back a fastening pressure of the first clutch 40 and the second brake 52 outputted to the second switch valve 250, and a return spring 249 elastically deformed in a moving direction of the valve spool 246 of the first switch valve 240.

A first control pressure port 247 of the first switch valve 240 is connected to the first solenoid valve 120 through the output line 606 of the first solenoid valve 120.

A second control pressure port 248 of the first switch valve 240 is connected to a feedback line 652 branched from the first output line 650 of the first switch valve 240.

The first switch valve 240 allows the input port 241 of the first switch valve 240 to be connected to a first output port 242 of the first switch valve 240 if there is no output pressure of the first solenoid valve 120. The second output port 243 of the first switch valve 240 is connected to the second discharge port 245 of the first switch valve 240.

Otherwise, the first switch valve 240 allows the input port 241 of the first switch valve 240 to be connected to a second output port 243 of the first switch valve 240 if there is an output pressure of the first solenoid valve 120. The first output port 242 of the first switch valve 240 is connected to the first discharge port 243 of the first switch valve 240. As a portion of a control pressure of the first clutch 40 and the second brake 52 outputted to the second switch valve 250 is fed back, connection between the input port 241 of the first switch valve 240 and the second output port 243 thereof is sustained. High speed shift ranges of fourth, fifth, and sixth speeds, in which the first clutch 40 is fastened, are thus not unintentionally released.

The second switch valve 250 allows the first clutch 40 to selectively receive a fastening pressure of the first clutch 40 and the second brake 52 depending on a fastening pressure of the second clutch 42 and a fastening pressure of the third brake 54, a fastening pressure of the first brake 50, and a line pressure.

The second switch valve 250 includes an input port 251 for inputting a fastening pressure of the first clutch 40 and the second brake 52 outputted from the first switch valve 240, a output port 252 for outputting a fastening pressure of the first clutch 40 and the second brake 52 inputted to second switch valve 250 to the first clutch 40, a discharge port 253 for discharging a pressure outputted to the first clutch 40, and a valve spool 255 for connecting the output port 252 to the input port 251 or the discharge port 253.

The input port 251 of the second switch valve 250 is connected to the first output line 65 of the first switch valve 240.

The output port 252 of the second switch valve 250 is connected to the first clutch 40 through an output line 660 of the second switch valve 250.

A valve spool 225 of the second switch valve 250 moves in a horizontal direction depending on a force equilibrium relation of a control pressure operation unit of the second switch valve 250.

The control pressure operation unit of the second switch valve 250 includes a first control pressure port 256 positioned in a left side of the valve spool 225 of the second switch valve 250 to input the line pressure, a second control pressure port 258 positioned in the middle of the valve spool 225 of the second switch valve 250 to input a fastening pressure of the first brake 50 or the second brake 52, a third control pressure port 257 positioned in a right side of the valve spool 225 of the second switch valve 250 to input a fastening pressure of the third brake 54, and a return spring 259 elastically deformed in a moving direction of a valve spool 225 of the second switch valve 250.

The first control pressure port 256 of the second switch valve 250 is connected to the line pressure oil path 600.

The second control pressure port 258 of the second switch valve 250 is connected to a fourth switch valve 270 for selectively outputting a fastening pressure of the first brake 50 or a fastening pressure of the second clutch 42 to the second switch valve 250.

The fourth switch valve 270 includes a first input port 271 for inputting a fastening pressure of the first brake 50, a second input port 272 for inputting a fastening pressure of the second clutch 42, an output port 273 connected to a second control pressure port 258 of the second switch valve 250 through an output line 670 of the fourth switch valve 270, a valve spool 274 for connecting the output port 273 to the first input port 271 or the second input port 272 depending on a force equilibrium relation between a fastening pressure of the first brake 50 and a fastening pressure of the second clutch 42.

The first input port 271 of the fourth switch valve 270 is connected to a first input line 671 of the fourth switch valve 270.

The second input port 272 of the fourth switch valve 270 is connected to a second input line 672 of the fourth switch valve 270.

The second switch valve 250 allows an output port 252 of the second switch valve 250 to connect to the discharge port 253 of the second switch valve 250 so that an input port 251 and an output port 252 of the second switch valve 250 are not connected to each other, in third speed in which both a fastening pressure of the second clutch 42 and a fastening pressure of the third brake 54 exist.

Otherwise, the second switch valve 250 allows the output port 252 of the second switch valve 250 to connect to the discharge port 253 of the second switch valve 250 so that an input port 251 and the output port 252 of the second switch valve 250 are not connected to each other, in second speed in which both fastening pressures of the first and second brakes 50 and 54 exist.

In other cases, the second switch valve 250 allows the input port 251 of the second switch valve 250 to connect to the output port 252 of the second switch valve 250.

The third switch valve 260 allows the second brake 52 to receive a fastening pressure of the first clutch 40 and the second brake 52 or a backward range pressure of the manual valve depending on a fastening pressure of the second clutch 42, a fastening pressure of the first brake 50, and a pressure of a backward range.

That is, the third switch valve 260 includes a first input port 261 for inputting a fastening pressure of the first clutch 40 and the second brake 52 outputted from the first switch valve 240, an output port 262 for outputting a fastening pressure of the first clutch 40 and the second brake 52 inputted to the third switch valve 260 to the second brake 52, a switch port 263 for inputting a backward range pressure of the manual valve or discharging a pressure outputted to the second brake 52, and a valve spool 264 for connecting the output port 262 to the input port 261 or the switch port 263.

The input port 261 of the third switch valve 260 is connected to the second output line 651 of the first switch valve 250.

The output port 262 of the third switch valve 260 is connected to the first brake 50 through an output line 680 of the third switch valve 260.

A switch port 263 of the third switch valve 260 is connected to the second clutch controller 300 through a switch line 681 of the second clutch controller 300 and the third switch valve 260 to input a backward range pressure of the manual valve or discharge a fastening pressure of the second brake 52 through the second clutch controller 300.

The valve spool of the third switch valve 260 moves in a horizontal direction by a force equilibrium relation of a control pressure operation unit of the third switch valve 260.

The control pressure operation unit of the third switch valve 260 includes a first control pressure port 265 for inputting a backward range pressure of the manual valve, a second control pressure port 266 for inputting a fastening pressure of the first brake 50 or the second clutch 52, and a return spring 267 elastically deformed in a moving direction of a valve spool 264 of the third switch valve 260.

The first control pressure port 265 of the third switch valve 260 is connected to a bypass line 682 of the third switch valve 260 which is branched from the switch line 681 of the third switch valve 260.

Similarly with the second switch valve 250, the second control pressure port 266 of the third switch valve 260 is connected to the fourth switch valve 270 to receive a fastening pressure of the first brake 50 or the second clutch 52.

The third switch valve 260 allows the output port 262 of the third switch valve 260 to connect to switch port 263 of the third switch valve 260 so that the input port 261 and the output port 262 of the third switch valve 260 are not connected to each other, in second, third, fifth, and sixth speeds in which a fastening pressure of the second clutch 42 or a fastening pressure of the first brake 50 exists. Fastening pressure of the first brake 50 is discharged through the switch port 263 of the third switch valve 260 and the second clutch controller 300.

The third switch valve 260 allows the output port 262 of the third switch valve 260 to be unconditionally connected to the switch port 263 of the third switch valve 260 so that the backward range pressure of the manual valve is supplied to the first brake 50 if the backward range pressure of the manual valve of valve 260 exists.

Figure 5:
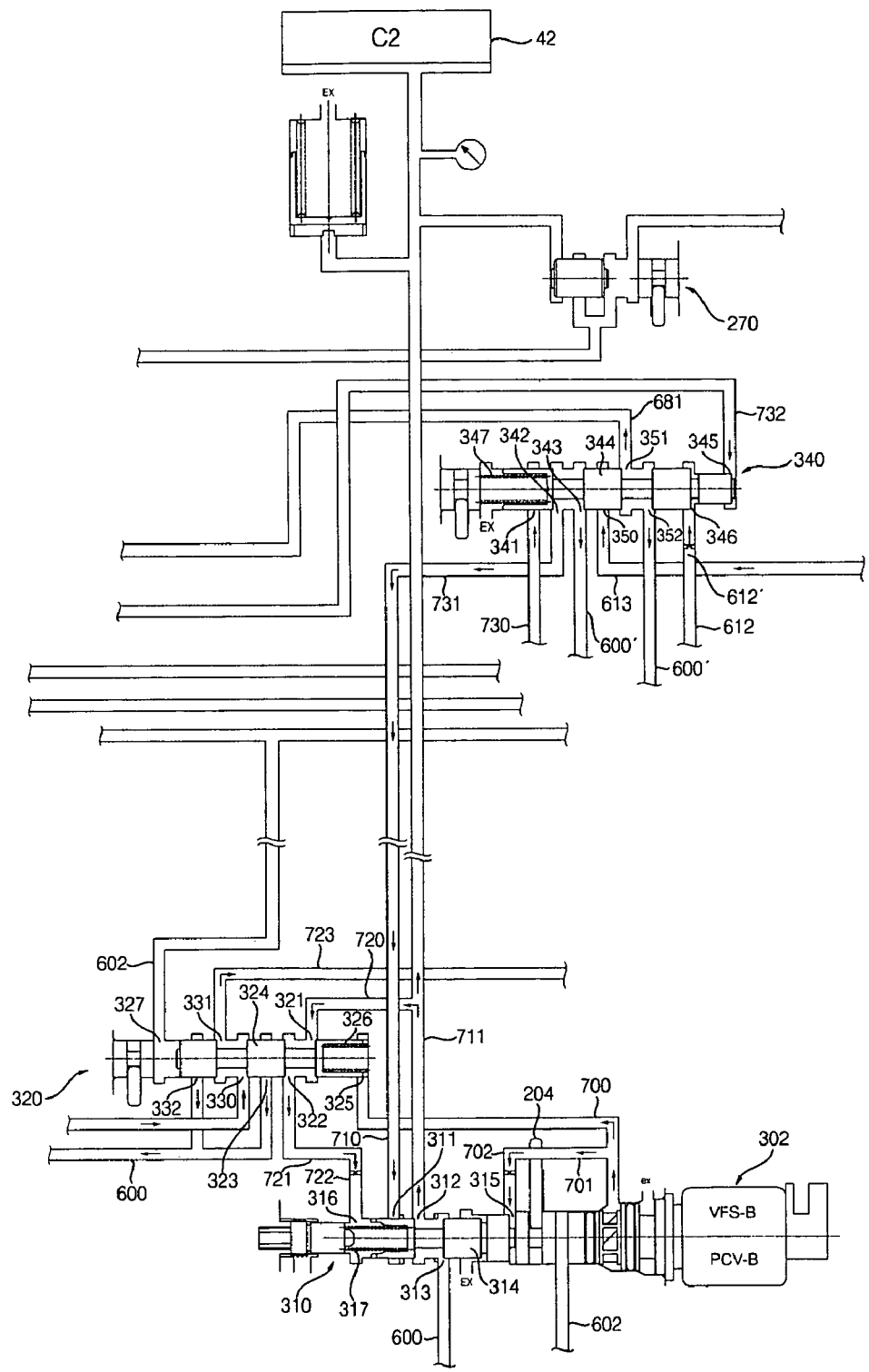
FIG. 5 is a diagram illustrating a second clutch controller.

Referring to FIG. 5, the second clutch controller 300 includes a second pressure control valve 310 (PCV-B) controlled by a second proportional control solenoid valve 302 (VFS-B), a first pressure switching valve 320, and a fifth switch valve 340. The second clutch controller 300 thus composed allows the second clutch 42 to operate by receiving a fastening pressure of the second clutch 42 in third and fifth speeds and reverse.

After receiving reducing decompression of the reducing valve and forming a proper control pressure, the second proportional control solenoid valve 302 outputs a control pressure controlled in the second proportional control solenoid valve 302 to the second pressure control valve 310 and the first pressure switching valve 320.

That is, the second proportional control solenoid valve 302 is connected to the reducing valve through the reducing decompression line 602 and connected to the second pressure control valve 310 and second pressure switching valve 320 through output lines 700 and 701 of the second proportional control solenoid valve 302.

An orifice 702 is provided in the output line 701 connected to the second pressure control valve 310 among output lines 700 and 701 of the second proportional control solenoid valve 302.

Such a second proportional control solenoid valve 302 may be a normally high type outputting a maximum control pressure of the second proportional control solenoid valve 302 to the second pressure control valve 310 and the second pressure switching valve 320 at power off.

The second proportional control solenoid valve 302 receives power in first, second, fourth, sixth, low, neutral, and park, and is in a power off state in third, fifth, and reverse.

The second proportional control solenoid valve 302 and the second pressure control valve 310 may be a one body type structure which is divided from the second pressure control valve 310 by the second plug 304.

The second pressure control valve 310 controls a fastening pressure of the first clutch 42 by a control pressure of the second proportional control solenoid valve 302.

The second pressure control valve 310 includes an input port 311 for inputting a line pressure, an output port 312 for outputting a fastening pressure of the second clutch 42, a discharge port 313 for discharging a fastening pressure of the second clutch 42, and a valve spool 314 for connecting the output port 312 to the input port 311 or the discharge port 313.

The input port 311 of the second pressure control valve 310 is connected to the fifth switch valve 340 through an input line 710 of the second pressure control valve 310 to receive a line pressure through the fifth switch valve 340.

The output port 312 of the second pressure control valve 310 is connected to the second clutch 42 through the output line 711 of the second pressure control valve 310.

The discharge port 313 of the second pressure control valve 310 is connected to the discharge line 600' so that a fastening pressure of the second clutch 42 is discharged through the residual pressure discharge valve.

The valve spool 314 of the second pressure control valve 310 moves in a horizontal direction depending on a force equilibrium relation of a control pressure operation unit of the second pressure control valve 310.

The control pressure operation unit of the second pressure control valve 310 includes a first control pressure port 315 positioned in a right side of the valve spool 314 of the second pressure control valve 310 to input a control pressure of the second proportional control solenoid valve 302, a second control pressure port 316 positioned in a left side of the valve spool 314 of the second pressure control valve 310 to input an output pressure of the second pressure switching valve 320, and a return spring 317 elastically deformed in a moving direction of the valve spool 314 of the second pressure control valve 310.

The second pressure control valve 310 allows the output port 312 of the second pressure control valve 310 to connect to the input port 311 of the second pressure control valve 310 in third and fifth speeds and reverse and allows the output port 312 of the second pressure control valve 310 to be connected to the discharge port 313 thereof upon shifting to other speeds.

The second pressure switching valve 320 is composed to feed back a fastening pressure of the second clutch 42 controlled in the second pressure control valve 310 to the second pressure control valve 310.

That is, the second pressure switching valve 320 includes a first input port 321 for inputting a fastening pressure of the second clutch 42 outputted from the second pressure control valve 310, a first output port 322 for feeding back a fastening pressure of the second clutch 42 inputted to the second pressure switching valve 320 to the second pressure control valve 310, a first discharge port 323 for discharging a fastening pressure of the second clutch 42 fed back to the second pressure control valve 310, and a first valve spool 324 for connecting the first output port 322 to the first input port 321 or the first discharge port 323.

The input port 321 of the second pressure switching valve 320 is connected to the input line 720 of the second pressure switching valve 320 branched from the output line 711 of the second pressure control valve 310.

The first output port 322 of the second pressure switching valve 320 is connected to the second control pressure port 316 of the second pressure control valve 310 through the first output line 721 of the second pressure switching valve 320.

An orifice 722 is provided in the first output line 721 of the second pressure switching valve 320.

The first discharge port 323 of the second pressure switching valve 320 is connected with to the discharge line 600' so that a fastening pressure of the second clutch 42 may discharge through the residual pressure discharge valve.

The first valve spool 324 of the second pressure switching valve 320 moves in a horizontal direction depending on a force equilibrium relation of a control pressure operation unit of the second pressure switching valve 320.

The control pressure operation unit of the second pressure switching valve 320 includes a first control pressure port 325 positioned in a right side of a first valve spool 324 of the second pressure switching valve 320 to input a control pressure of the second proportional control solenoid valve 302, a return spring 326 elastically deformed in a moving direction of the first valve spool 324 of the second pressure switching valve 320, and a second control pressure port 327 positioned in a right side of first valve spool 324 of the second pressure switching valve 320 to input decompression of the reducing valve.

The first control pressure port 325 of the second pressure switching valve 320 is connected to the output line 700 of the second proportional control solenoid valve 302.

The second control pressure port 325 of the second pressure switching valve 320 is connected to the reducing decompression line 602.

The second pressure switching valve 320 further includes a second input port 330 for inputting a forward range pressure of the manual valve, a second output port 331 for outputting a forward range pressure of the manual valve inputted to the second pressure switching valve 320 to the first brake controller 400, a second discharge port 332 for discharging the forward range pressure of the manual valve outputted to the first brake controller 400, and a second valve spool for connecting the second output port 331 to the second input port 330 or the second discharge port 332 depending on a force equilibrium relation between a control pressure of the second proportional control solenoid valve 302, decompression of the reducing valve, and the return spring 326.

The second input port 330 of the second pressure switching valve 320 is connected to the manual valve through the forward range pressure line 610.

The second output port 331 of the second pressure switching valve 320 is connected to the first brake controller 400 through the second output line 723 of the second pressure switching valve 320.

The second discharge port 332 of the second pressure switching valve 320 is connected to the discharge line 600' so that a forward range pressure supplied to the second pressure switching valve 320 may be discharged through the residual pressure discharge valve.

The second valve spool of the second pressure switching valve 320 and the first valve spool 324 of the second pressure switching valve 320 may be one body.

The fifth switch valve 340 is configured so that a line pressure passed through the first brake controller 400 may be selectively inputted to the second pressure control valve 310 depending on an output pressure of the second solenoid valve 122 (SS-B) or a reverse range pressure of the manual valve.

That is, the fifth switch valve 340 includes a first input port 341 for inputting a line pressure passed through the first brake controller 400, a first output port 342 for outputting a line pressure inputted to the fifth switch valve 340 to the second pressure control valve 310, a first discharge port 343 for discharging a line pressure outputted to the second pressure control valve 310, and a first valve spool 344 for connecting the first output port 342 to the first input port 341 or the first discharge port 343.

The first input port 341 of the fifth switch valve 340 is connected to the first brake controller 400 through the first input line 730 of the fifth switch valve 340.

The first output port 342 of the fifth switch valve 340 is connected to the second pressure control valve 210 through the first output line 731 of the fifth switch valve 340.

The first discharge port 343 of the fifth switch valve 340 is connected to the discharge line 600' so that a line pressure supplied to the first pressure control valve 210 may be discharged through the residual pressure discharge valve.

The first valve spool 344 of the fifth switch valve 340 moves in a horizontal direction depending on a force equilibrium relation of a control pressure operation unit of the fifth switch valve 340.

The controller operation unit of the fifth switch valve 340 includes a first control pressure port 345 for inputting an output pressure of the second solenoid valve 122, a second control pressure port 346 for inputting a backward range pressure of the manual valve, and a return spring 347 elastically deformed in a moving direction of the first valve spool 344 of the fifth switch valve 340.

The first control pressure port 345 of the fifth switch valve 340 is connected to the second solenoid valve 122 through an output line 732 of the second solenoid valve 122.

The second control pressure port 346 of the fifth switch valve 340 is connected to the backward range pressure line 612 provided with an orifice 612' in the second control pressure port 345 side of the fifth switch valve 340.

In addition, the fifth switch valve 340 further includes a second input port 350 for inputting a reverse range pressure of the manual valve, a second output port 351 for outputting a reverse range pressure of the manual valve inputted to the fifth switch valve 340 to a third switch valve 260 of the first clutch and second brake controller 200, a second discharge port 352 for discharging a reverse range pressure of the manual valve outputted to the third switch valve 260 of the first clutch and second brake controller 200, and a second valve spool for connecting the second output port 351 to the second input port 350 or the second discharge port 353 depending on a force equilibrium relation between an output pressure of the first solenoid valve 122, a reverse range pressure of the manual valve, and a return spring 347.

The second input port 350 of the fifth switch valve 340 is connected to a backward range pressure bypass line 613 branched from the reverse range pressure line 612.

The second output port 351 of the fifth switch valve 340 is connected to the third switch valve 260 of the first clutch and second brake controller 200 through a switch line 681 of the third switch valve 260.

The second discharge port 352 of the fifth switch valve 340 is connected to the discharge line 600' so that a backward range pressure supplied to the first clutch and the second brake controller 200 may be discharged through the residual pressure discharge valve.

The second valve spool of the fifth switch valve 340 and the first valve spool 344 of the fifth switch valve 340 may be one body.

Figure 6:
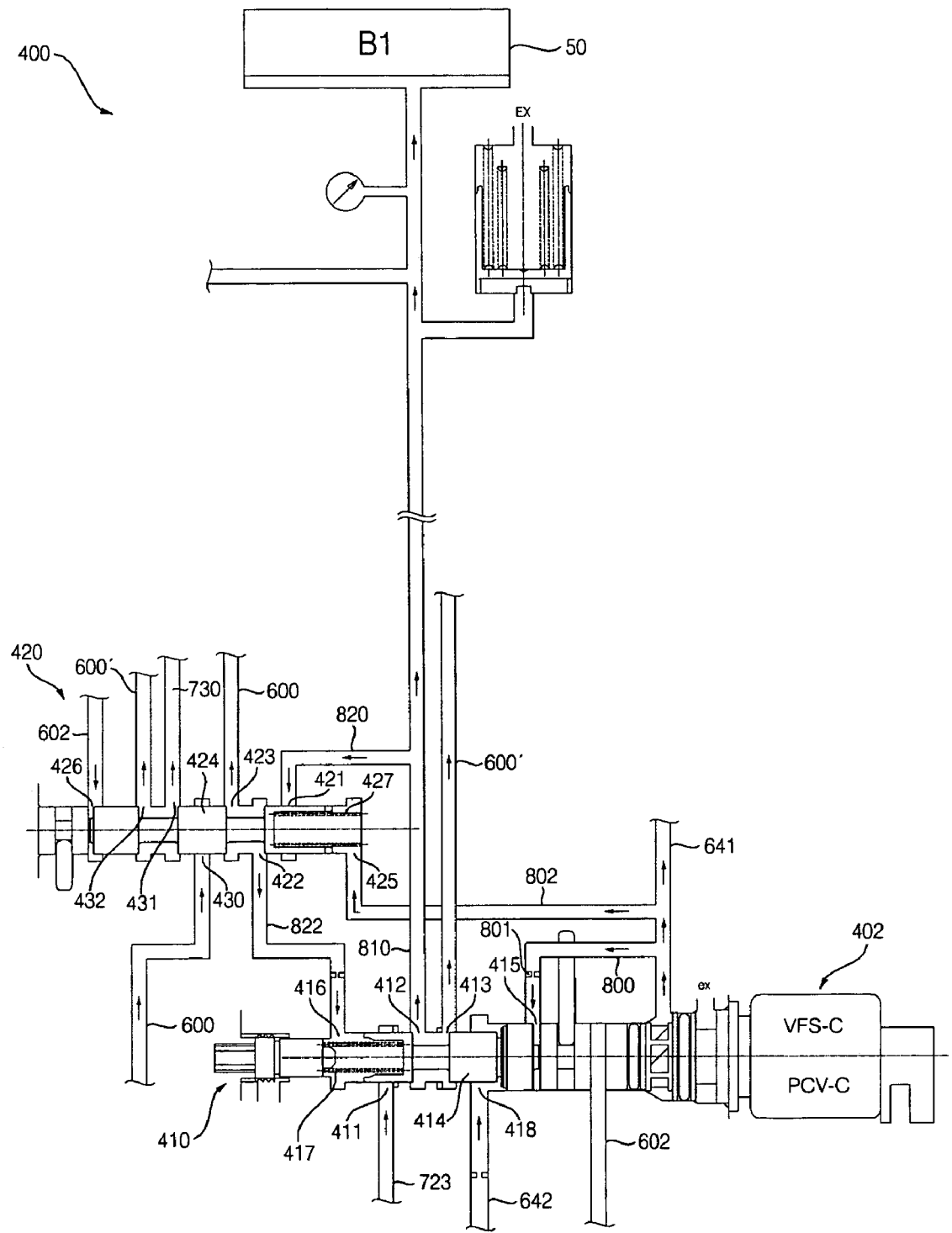
FIG. 6 is a diagram illustrating a first brake controller.

Referring to FIG. 6, the first brake controller 400 includes a third pressure control valve 410 (PCV-C) for controlling a forward range pressure of the manual valve inputted through the second clutch controller 300 by a control pressure of the third proportional control solenoid valve 402 (VFS-C) with a fastening pressure of the first brake 50 and a third pressure switching valve 420 for feeding back a fastening pressure of the first brake 50 controlled in the third pressure control valve 410 to the third pressure control valve 410. The first brake controller 400 thus composed allows the first brake 50 to receive a fastening pressure of the first brake 50 and operate in second and sixth speeds.

After receiving decompression of the reducing valve and forming a proper control pressure, the third proportional control solenoid valve 402 outputs a control pressure controlled in the third proportional control solenoid valve 402 to the third pressure control valve 410 and the third pressure switching valve 420.

That is, the third proportional control solenoid valve 402 is connected to the reducing valve through the reducing decompression line 602 and is connected to the third pressure control valve 410 and third pressure switching valve 420 through first and second output lines 800 and 802 of the third proportional control solenoid valve 402.

An orifice 801 is provided in the first output line 800 of the first proportional control solenoid valve 202.

Specifically, the third proportional control solenoid valve 402 is connected to the first pressure switching valve 220 of the first clutch and second brake controller 200 through a feedback input line 641 of the first pressure switching valve 220 so that a control pressure of the third proportional control solenoid valve 402 may feed back to the third pressure control valve 410 via the first pressure switching valve 220 of the first clutch and second brake controller 200.

Such a third proportional control solenoid valve 402 may be a normally low type which does not output a control pressure of the third proportional solenoid valve 402 to the third pressure control valve 410 and the third pressure switching valve 420 at power off.

The third proportional control solenoid valve 402 thus embodied receives power in second and sixth speeds and is in a power off state upon shifting to other speeds.

The third proportional control solenoid valve 402 and the third pressure control valve 410 may be body type structure which is divided from the third pressure control valve 410 by the third plug 404.

The third pressure control valve 410 includes an input port 411 for inputting a forward range pressure of the manual valve passed through the second clutch controller 300, an output port 412 for outputting a fastening pressure of the first brake 50, a discharge port 413 for discharging the fastening pressure of the first brake 50, and a valve spool 414 for connecting the output 412 to the input port 411 or the discharge port 413.

The input port 411 of the third pressure control valve 410 is connected to the second output line 723 of the second pressure switching valve 320 through the second output line 723 of the second pressure switching valve 320 and the second pressure switching valve 320 of the second clutch controller 300.

The output port 412 of the third pressure control valve 410 is connected to the first brake 50 through the output line 810 of the third pressure control valve 410.

The discharge port 413 of the third pressure control valve 410 is connected to the discharge line 600' so that a fastening pressure of the first brake 50 may be discharged through the residual pressure discharge valve.

The valve spool 414 of the third pressure control valve 410 moves in a horizontal direction depending on a force equilibrium relation of a control pressure operation unit of the third pressure control valve 410.

The control pressure operation unit of the third pressure control valve 410 includes a first control pressure port 415 for inputting a control pressure of the third proportional control solenoid valve 402, a second control pressure port 416 for inputting an output pressure of the third pressure switching valve 420, and a return spring 417 elastically deformed in a moving direction of the valve spool 414 of the third pressure control valve 410.

The first control pressure port 415 of the third pressure control valve 410 is connected to the third proportional control solenoid valve 402 through a first output line 800 of the third proportional control solenoid valve 402.

The second control pressure port 416 of the third pressure control valve 410 is connected to the third pressure switching valve 420 through the output line 822 of the third pressure switching valve 410.

Specifically, the control pressure operation unit of the third pressure control valve 410 further includes a third control pressure port 418 for feeding back a control pressure of the third proportional control solenoid valve 402 passed through the first pressure switching valve 220 of the first clutch and second brake controller 200 only in sixth speed so that a fastening pressure of the first brake 50 is different in second and sixth speeds.

The third control pressure port 418 of the third pressure control valve 410 is connected to the first pressure switching valve 220 of the first clutch and the second brake controller 200 through a feedback output line 642 of the first pressure switching valve 220.

The third pressure switching valve 420 includes a first input port 421 for inputting a fastening pressure of the first brake 50 outputted from the third pressure control valve 410, a first output port 422 for feeding back a fastening pressure of the first brake 50 inputted to the third pressure switching valve 420 to the third pressure control valve 410, a first discharge port 423 for discharging a fastening pressure of the first brake 50 fed back to the third pressure control valve 410, and a first valve spool 424 for connecting the first output port 422 to the first input port 421 or the first discharge port 423.

The first input port 421 of the third pressure switching valve 420 is connected to the input line 820 of the third pressure switching valve 420 branched from the output line 810 of the third pressure control valve 420.

The first output port 422 of the third pressure switching valve 420 is connected to the third pressure control valve 410 through the output line 822 of the third pressure switching valve 410.

The first discharge port 423 of the third pressure switching valve 420 is connected to the discharge line 600' so that a fastening pressure of the first brake 50 fed back from the third pressure switching valve 420 to the third pressure control valve 410 may be discharged through the residual pressure discharge valve.

The first valve spool 424 of the third pressure switching valve 420 moves in a operational direction depending on a force equilibrium relation of a control pressure operation unit of the third pressure switching valve 420.

The control pressure operation unit of the third pressure switching valve 420 includes a first control pressure port 425 for inputting a control pressure of the third proportional control solenoid valve 402, a second control pressure port 426 for inputting decompression of a reducing valve which decompresses a line pressure, and a return spring 427 which is elastically deformed in a moving direction of the valve spool 424 of the third pressure switching valve 420.

The first control pressure port 425 of the third pressure switching valve 420 is connected to the third proportional control solenoid valve 402 through the second outline 802 of the third proportional control solenoid valve 402.

The second control pressure port 425 of the third pressure switching valve 420 is connected to the reducing valve through the reducing decompression line 602.

The third pressure switching valve 420 further includes a second input port 430 for putting a line pressure, a second output port 431 for outputting a line pressure inputted to the third pressure switching valve 420 to the fifth switch valve 340 of the second clutch controller 300, a second discharge port 432 for discharging a line pressure outputted to the fifth switch valve 340 of the second clutch controller 300, and a second valve pool for connecting the second output port 431 to the second input port 430 or the second discharge port 432 depending on a force equilibrium relation between a control pressure of the third proportional control solenoid valve 402, decompression of the reducing valve, and a return spring.

The second input port 430 of the third pressure switching valve 420 is connected to the line pressure oil path 600.

The second output port 431 of the third pressure switching valve 420 is connected to a fifth switch valve 340 of the second clutch controller 300 through a first input line 730 of the fifth switch valve 340.

The second discharge port 432 of the third pressure switching valve 420 is connected to the discharge line 600' so that a line pressure supplied to the fifth switch valve 340 of the second clutch controller 300 may be discharged through the residual pressure discharge valve.

Figure 7:
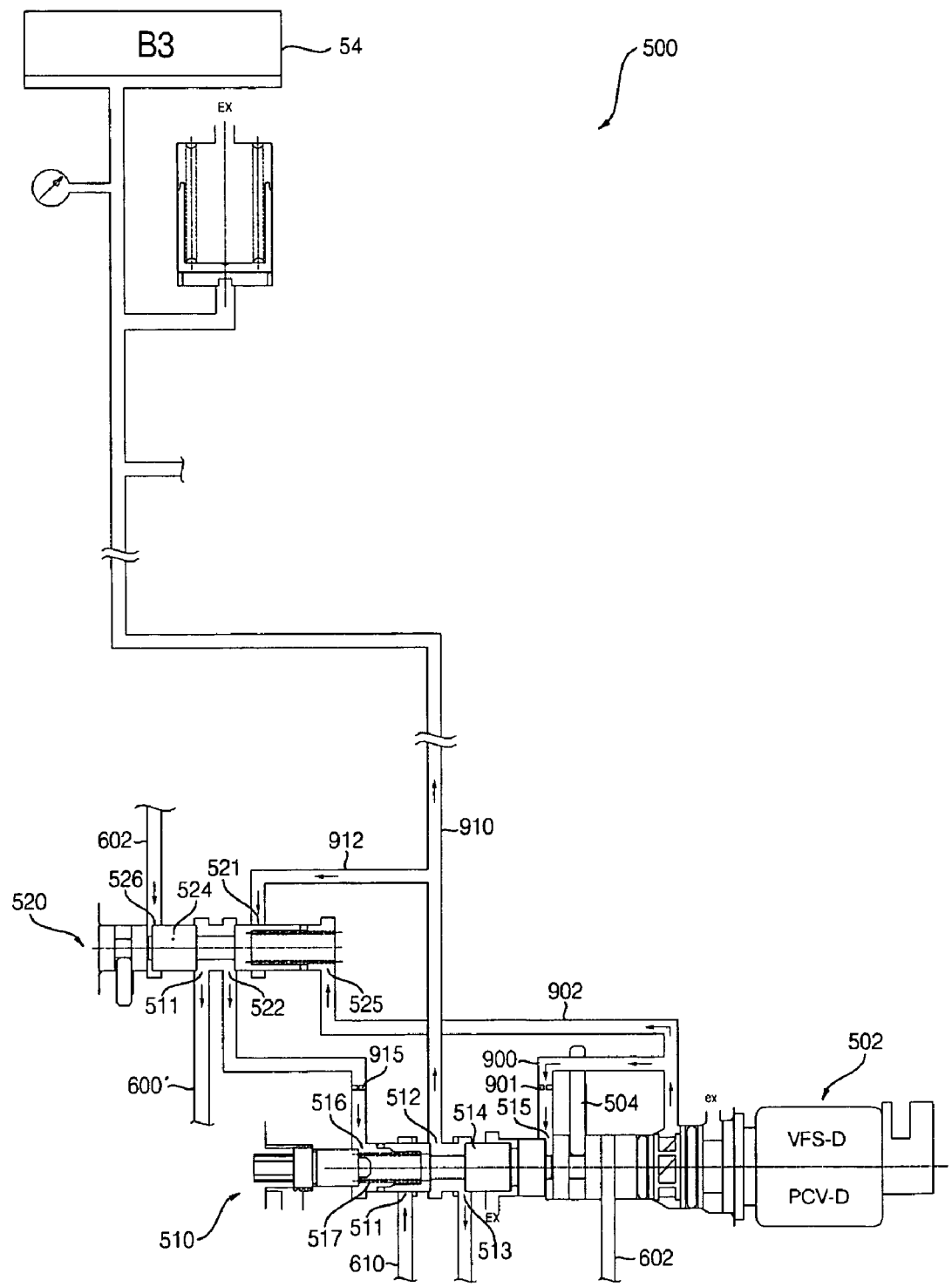
FIG. 7 is a diagram illustrating a first clutch and third brake controller.

Referring to FIG. 7, the third brake controller 500 includes a fourth pressure control valve 510 (PCV-D) for controlling a forward range pressure of the manual valve with a fastening pressure of the third brake 54 and a fourth pressure switching valve 520 for feeding back a fastening pressure of the third brake 54 controlled by the fourth pressure control valve 510 to the fourth pressure control valve 510, by means of an output pressure of a fourth proportional control solenoid valve 502. (VFS-D). The third brake controller 500 thus composed allows the third brake 54 to receive a fastening pressure of the third brake 54 and operate in first through fourth speeds.

After receiving reducing decompression of the reducing valve and forming a proper control pressure, the fourth proportional solenoid valve 502 outputs a control pressure controlled in the fourth proportional control solenoid valve 502 to the fourth pressure control valve 510 and the fourth pressure switching valve 520.

That is, the fourth proportional control solenoid valve 502 is connected to the reducing valve through the reducing decompression line 602 and connected to the fourth pressure control valve 510 and fourth pressure switching valve 520 through output lines 900 and 902 of the fourth proportional control solenoid valve.

An orifice 901 is provided in a first output line 900 of the fourth proportional solenoid valve 502.

Such a fourth proportional control solenoid valve 502 may be a normally high type which outputs a maximum control pressure of the fourth proportional control solenoid valve 502 to the fourth pressure control valve 510 and the fourth pressure switching valve 520 at power off.

The fourth proportional control solenoid valve 502 thus embodied receives power in fifth and sixth speeds, reverse, neutral, and park, and is in a power off state in first through fourth speeds.

The fourth proportional control solenoid valve 502 and the fourth pressure control valve 510 may be a one body type structure which is divided from the fourth pressure control valve 510 by the fourth plug 504.

The fourth pressure control valve 510 includes an input port 511 for inputting a forward range pressure of the manual valve, an output port 512 for outputting a fastening pressure of the third brake 54, a discharge port 513 for discharging a fastening pressure of the third brake 54, and a valve spool 514 for connecting the output port 512 to the input port 511 or the discharge port 513.

The input port 511 of the fourth pressure control valve 510 is connected to the manual valve through the forward range pressure line 610.

The output port 512 of the fourth pressure control valve 510 is connected to the third brake 54 through the output line 910 of the fourth pressure control valve 510.

The discharge port 513 of the fourth pressure control valve 510 is connected to the discharge line 600' so that a fastening pressure of the third brake 54 supplied to the third brake 54 may be discharged through the residual pressure discharge valve.

The valve spool 514 of the fourth pressure control valve 510 moves in a horizontal direction depending on a force equilibrium relation of a control pressure operation unit of the fourth pressure control valve 510.

The controller operation unit of the fourth pressure control valve 510 includes a first control pressure port 515 for inputting a control pressure of the fourth proportional control solenoid valve 502, a second control pressure port 516 for inputting an output pressure of the fourth pressure switching valve 520, and a return spring 517 which is elastically deformed in a moving direction of a valve spool 514 of the fourth pressure control valve 510.

The first control pressure port 515 of the fourth pressure control valve 510 is connected to a fourth proportional control solenoid valve 502 through a first output line 900 of the fourth proportional control solenoid valve 502.

The second control pressure port 516 of the fourth pressure control valve 510 is connected to a fourth pressure switching valve 520 through an output line 914 of the forth pressure switching valve 520. An orifice 915 is provided in the output line 914 of the fourth pressure switching valve 520.

The fourth pressure switching valve 520 includes an input port 521 for inputting a fastening pressure of the third brake 54 outputted from the fourth pressure control valve 510, an output port 522 for feeding back a fastening pressure of the third brake 54 inputted to the fourth pressure switching valve 520 to the fourth pressure control valve 510, a discharge port 523 for discharging a fastening pressure of the third brake 54 fed back to the fourth pressure control valve 510, and a valve spool 524 for connecting the output port 522 to the input port 521 or the discharge port 523.

The input port 521 of the fourth pressure switching valve 520 is connected to the fourth pressure switching valve 520 through the input line 912 of the fourth pressure switching valve 520 branched from the output line 910 of the fourth pressure control valve 510.

The output port 522 of the fourth pressure switching valve 520 is connected to the fourth pressure control valve 510 through the output line 914 of the fourth pressure switching valve 520.

The valve spool 523 of the fourth pressure switching valve 520 moves in a horizontal direction depending on a force equilibrium relation of a control pressure operation unit of the fourth pressure switching valve 520.

The control pressure operation unit of the fourth pressure switching valve 520 includes a first control pressure port 525 for inputting a control pressure of the fourth proportional control solenoid valve 502, a second control pressure port 526 for inputting decompression of a reducing valve decompressing a line pressure, and a return spring 527 which is elastically deformed in a moving direction of a valve spool 524 of the fourth pressure switching valve 520.

The first control pressure port 525 of the fourth pressure switching valve 520 is connected to the second output line 902 of the fourth proportional control solenoid valve 502.

The second control pressure port 526 of the fourth pressure switching valve 520 is connected to a reducing decompression line 602.

Operation states for each shift range of an oil pressure control system of the six speed automatic transmission according to the present invention having the above-mentioned construction will be described in detail.

Because vehicles generally start in neutral or park, as shown in FIG. 3, a line park, it is supplied through a line pressure oil path 600 while an oil pump 100 is driven when vehicles start.

Because the line pressure indicates that the manual valve 106 is in neutral or park, it is on standby in the manual valve 106.

Further, the line pressure is supplied to the second switch valve 250 and the fifth switch valve 340 and on standby.

Furthermore, the line pressure is supplied to the reducing valve 104 where it is decompressed.

The decompressed line pressure generated in the reducing valve 104 is supplied to a first, second, third, and fourth proportional control solenoid valves 202, 302, 402, and 502, a first, second, third, and fourth pressure switching valves 220, 320, 420, and 520, and the first and second solenoid valves 120 and 122 through the reducing decompression line 602 and on standby.

If the manual valve 106 is switched to a forward range, a forward range pressure generated in the manual valve 106 is supplied through the forward range pressure oil path 610 and as shown in FIG. 8, the first, second, third, and fourth proportional control solenoid valves 202, 302, 402, and 502, and the first and second solenoid valves 120 and 122 selectively receive power and a shift is selectively performed to any one of first through sixth speeds depending on driving conditions.

Hereinafter, a forward one speed operation state of an oil pressure control system of a six speed automatic transmission according to the present invention will be described in detail with reference to FIG. 9.

Upon shift command to first speed, power is applied to the first and second proportional control solenoid valves 202 and 302, and the third and fourth proportional control solenoid valves 402 and 502, and the first and second solenoid valves 120 and 122 are powered off.

Therefore, as a control pressure of the fourth proportional control solenoid valve 502 is supplied to the fourth pressure control valve 510 and the fourth pressure switching valve 520 and a forward range pressure of the manual valve 106 is supplied to the fourth pressure control valve 510, a fastening pressure of the third brake 54 is formed. Then, as the third brake 54 operates by the fastening pressure of the third brake, first speed is embodied.

Other fastening elements are not operated because the first, second, and third pressure control valves 210, 310, and 410 do not form a fastening pressure of each fastening element.

Figure 10:
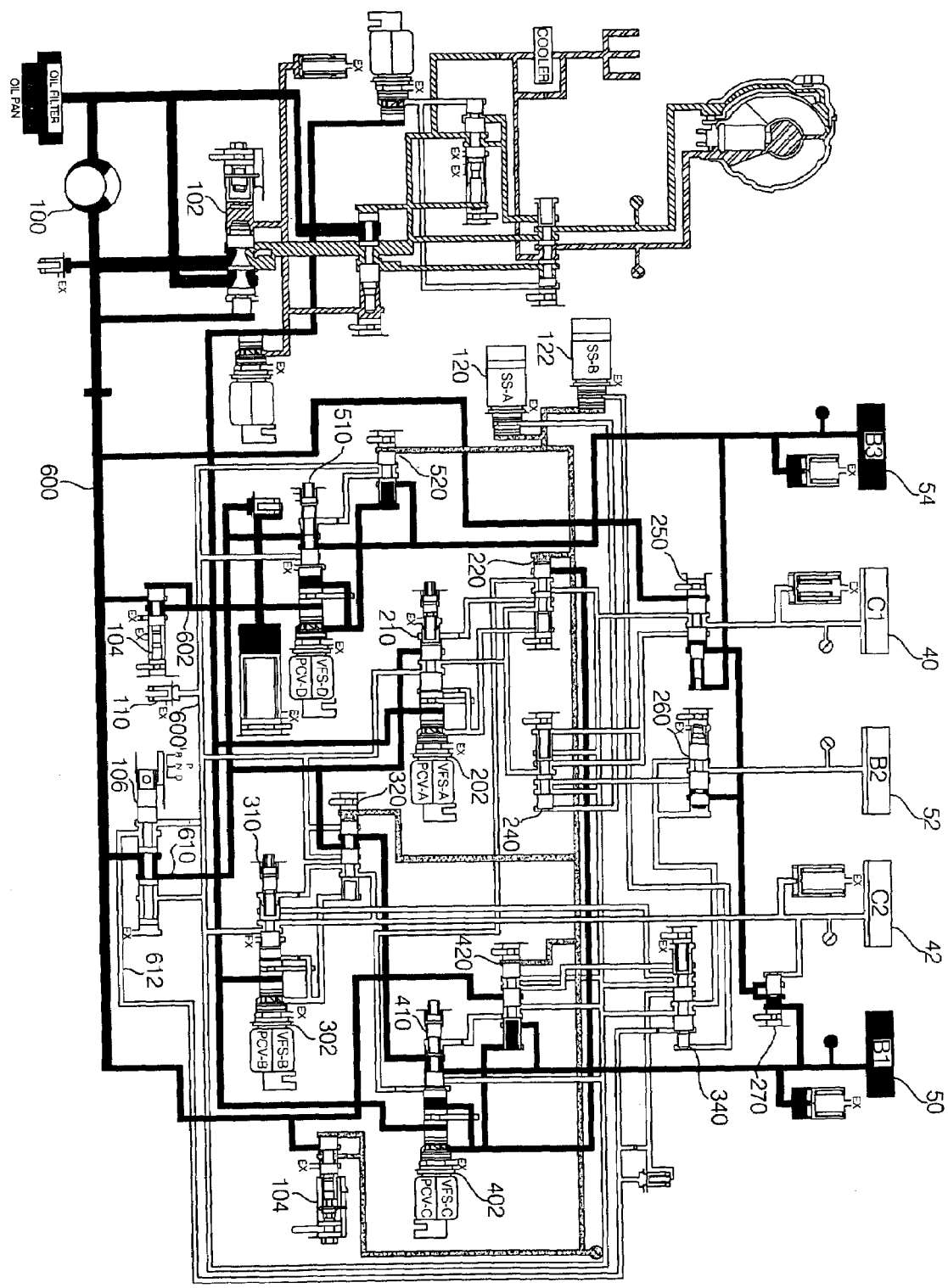
FIG. 10 is an oil pressure circuit diagram in second speed.

Referring to FIG. 10, upon shift command to second speed, power is applied to the first second, and third proportional control solenoid valves 202, 302, and 402 and the forth proportional control solenoid valve 502 and the first and second solenoid valve 120 and 122 are powered off.

Therefore, a control pressure of the third proportional control solenoid valve 402 is supplied to the third pressure control valve 410 and the third pressure switching valve 420 and the forward range pressure of the manual valve 106 is supplied to the third pressure control valve 410 through the second pressure switching valve 320.

Then, the forward range pressure of the manual valve 106 is controlled by a fastening pressure of the first brake 50 in the third pressure control valve 410 and a fastening pressure of the first brake 50 controlled in the third pressure control valve 410 is supplied to the first brake 50, so that the first brake 50 is operated by a fastening pressure of the first brake 50.

At the same time, the control pressure of the fourth proportional control solenoid valve 502 is supplied to the fourth pressure control valve 510 and the fourth pressure switching valve 520.

Then, in the fourth pressure control valve 510, the forward range pressure of the manual valve 106 is controlled by a fastening pressure of the third brake 54 and a fastening pressure of the third brake 54 controlled in the fourth pressure control valve 510 is supplied to the third brake 54, so that the third brake 54 is operated by a fastening pressure of the third brake 54.

When the first and third brakes 50 and 54 are operated, second speed is embodied.

Figure 11:
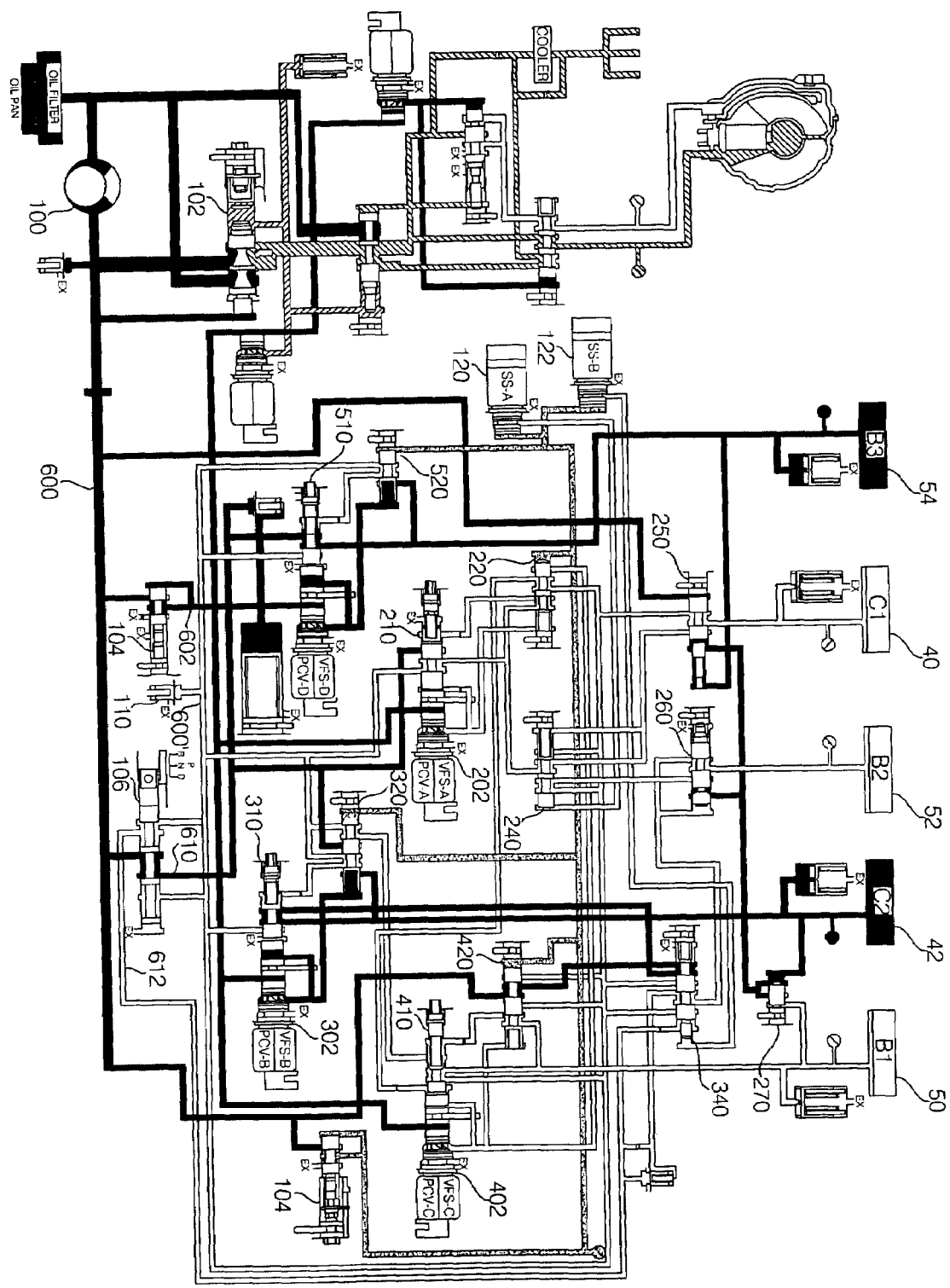
FIG. 11 is an oil pressure circuit diagram in third speed.

Referring to FIG. 11, upon shift command to third speed, power is applied to the first and second proportional control solenoid valves 202 and 302 and the second, third, and fourth proportional control solenoid valves 302, 402, and 502 and the first solenoid valve 120 are powered off.

Therefore, a control pressure of the second proportional control solenoid valve 302 is supplied to the second pressure control valve 310 and the second pressure switching valve 320 and the line pressure is supplied to the fifth switch valve 340 through the third pressure switching valve 420. In addition, an output pressure of the second solenoid valve 122 is supplied to the fifth switch valve 340.

Then, because the fifth switch valve 340 receives an output pressure of the second solenoid valve 122, a line pressure passed through the third pressure switching valve 420 is delivered to the second pressure control valve 320.

The second pressure control valve 310 controls a line pressure received through the fifth switch valve 340 with a fastening pressure of the second clutch 42. A fastening pressure of the second clutch 42 controlled in the second pressure control valve 310 is supplied to the second clutch 42. Then, the second clutch 42 is operated by a fastening pressure of the second clutch 42.

At the same time, a control pressure of the fourth proportional control solenoid valve 502 is supplied to the fourth pressure control valve 510 and the fourth pressure switching valve 520.

Then, in the fourth pressure control valve 510, a forward range pressure of the manual valve 106 is controlled by a fastening pressure of the third brake 54 and a fastening pressure of the third brake 54 controlled in the fourth pressure control valve 510 is supplied to the third brake 54, so that the third brake 54 is operated by a fastening pressure of the third brake 54.

When the second clutch 42 and the third brake 54 are operated at the same time, third speed is embodied.

Figure 12:
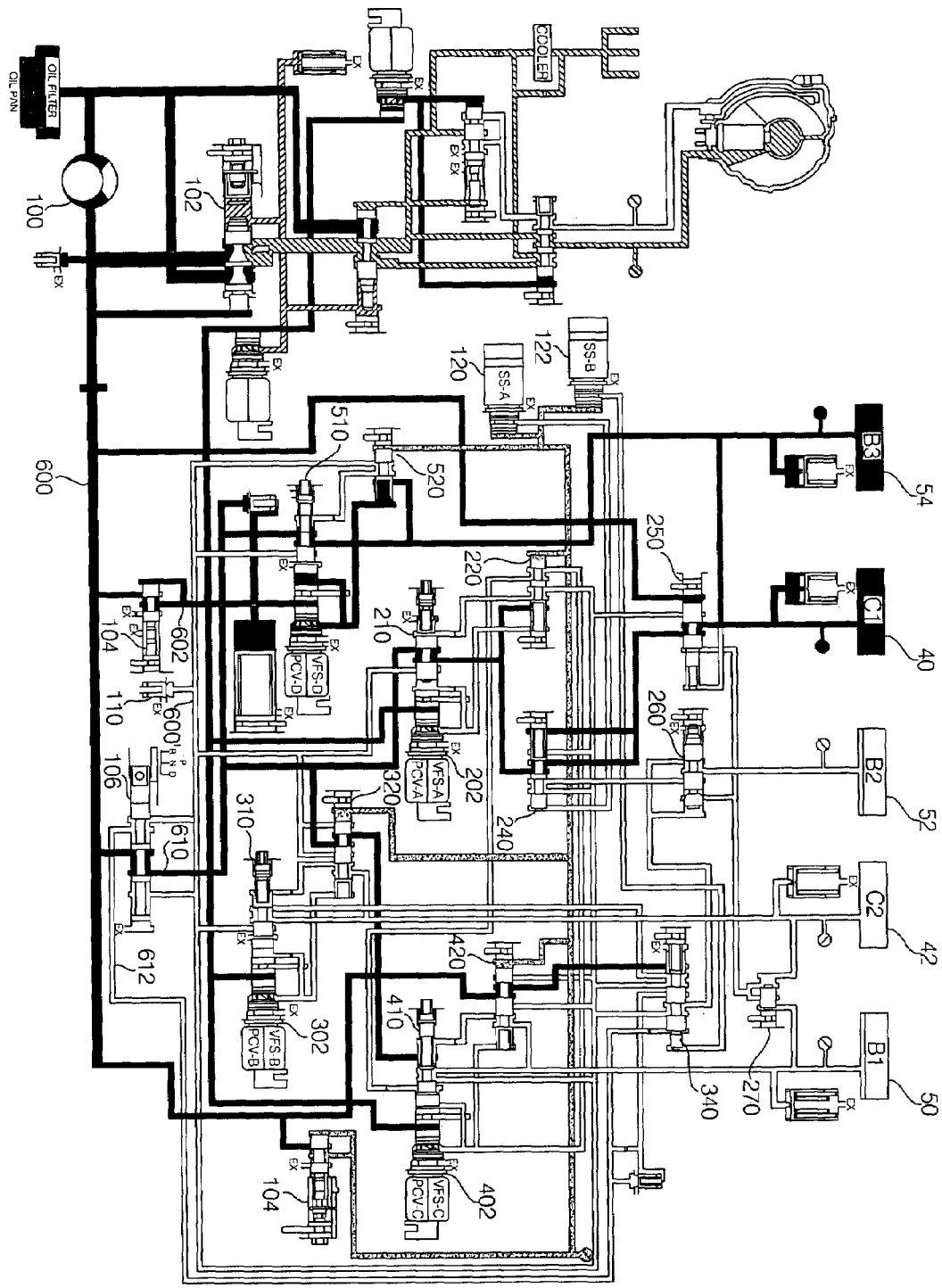
FIG. 12 is an oil pressure circuit diagram in fourth speed.

Referring to FIG. 12, upon shift command to fourth speed, power is applied to the second proportional control solenoid valve 302, and the first, third, and fourth proportional control solenoid valves 202, 402, and 502 and the first and second solenoid valves 120 and 122 are powered off.

Therefore, a control pressure of the first proportional control solenoid valve 202 is supplied to the first pressure control valve 210 and the first pressure switching valve 220 and a forward range pressure of the manual valve 106 is supplied to the first pressure control valve 210.

Then, in the first pressure control valve 210, a forward range pressure of the manual valve 106 is controlled by a fastening pressure of the first clutch 40 and the second brake 52 and a fastening pressure of the first clutch 40 and the second brake 52 controlled in the first pressure control valve 210 is delivered to the first switch valve 240.

Because the first switch valve 240 does not receive an output pressure of the first solenoid valve 120, it allows a fastening pressure of the first clutch 40 and the second brake 52 outputted from the first pressure control valve 210 to be delivered to second switch valve 250.

Because the second switch valve 250 receives only a fastening pressure of the third brake 54, it allows a fastening pressure of the first clutch 40 and the second brake 52 outputted from the first switch valve 240 to be delivered to the first clutch 40.

Then, the first clutch 40 is operated by a fastening pressure of the first clutch 40 and the second brake 52.

At the same time, a control pressure of the fourth proportional control solenoid valve 502 is supplied to the fourth pressure control valve 510 and the fourth pressure switching valve 520.

Then, in the fourth pressure control valve 510, a forward range pressure of the manual valve 106 is controlled by a fastening pressure of the third brake 54 and a fastening pressure of the third brake 54 controlled in the fourth pressure control valve 510 is supplied to the third brake 54, so that the third brake 54 is operated by a fastening pressure of the third brake 54.

When the first clutch 40 and the third brake 54 are operated at the same time, fourth speed is embodied.

Figure 13:
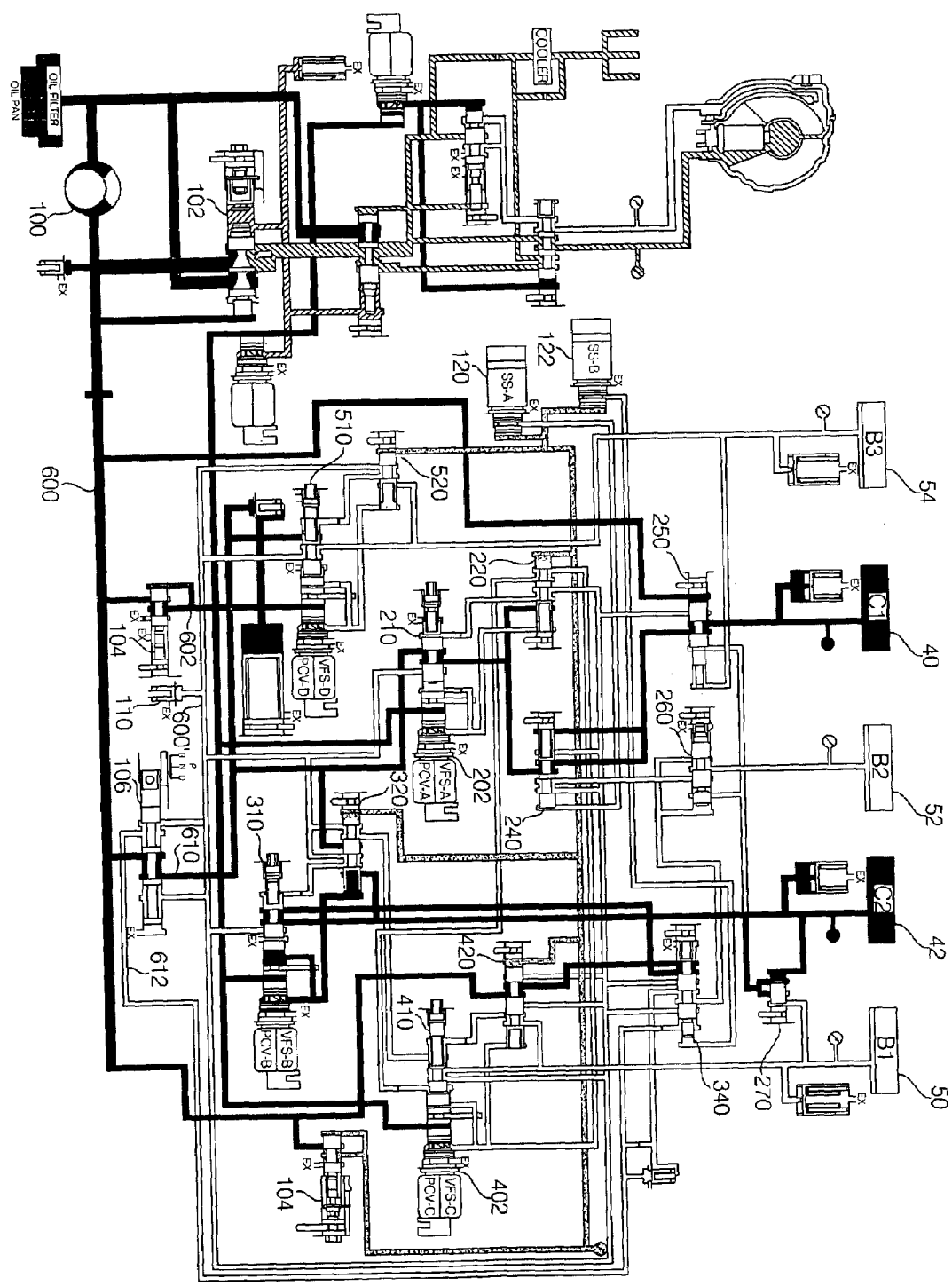
FIG. 13 is an oil pressure circuit diagram in fifth speed.

Referring to FIG. 13, upon shift command to fifth speed, power is applied to the fourth proportional control solenoid valve 502 and the second solenoid valve 122 and the first, second, and third proportional control solenoid valves 202, 302, and 402 and the first solenoid valve 120 are powered off.

Therefore, a control pressure of the first proportional control solenoid valve 202 is supplied to the first pressure control valve 210 and the first pressure switching valve 220 and a forward range pressure of the manual valve 106 is supplied to the first pressure control valve 210.

Then, in the first pressure control valve 210, a forward range pressure of the manual valve 106 is controlled by a fastening pressure of the first clutch 40 and the second brake 52 and a fastening pressure of the first switch 40 and the second brake 52 controlled in the first pressure control valve 210 is delivered to the first switch valve 240.

Because the first switch valve 240 does not receive an output pressure of the first solenoid valve 120, it allows a fastening pressure of the first clutch 40 and the second brake 52 outputted from the first pressure control valve 210 to be delivered to the second switch valve 250.

Because the second switch valve 250 receives only a fastening pressure of the third brakes 54, it allows a fastening pressure of the first clutch 40 and the second brake 52 outputted from the first switch valve 240 to be delivered to the first clutch 40.

Then, the first clutch 40 is operated by a fastening pressure of the first clutch 40 and the second brake 52.

At the same time, a control pressure of the second proportional control solenoid valve 302 is supplied to the second pressure control valve 310 and the second pressure switching valve 320 and the line pressure is supplied to the fifth switch valve 340 through the third pressure switching valve 420. In addition, an output pressure of the second solenoid valve 122 is supplied to the fifth switch valve 340.

Then, because the fifth switch valve 340 receives an output pressure of the second solenoid valve 122, a line pressure passed through the third pressure switching valve 420 is delivered to the second pressure control valve 310.

The second pressure control valve 310 controls a line pressure received through the fifth switch valve 340 with a fastening pressure of the second clutch 42. A fastening pressure of the second clutch 42 controlled in the second pressure control valve 310 is supplied to the second clutch 42. Then, the second clutch 42 is operated by a fastening pressure of the second clutch 42.

When the first and second clutches 40 and 42 are operated at the same time, fifth speed is embodied.

Figure 14:
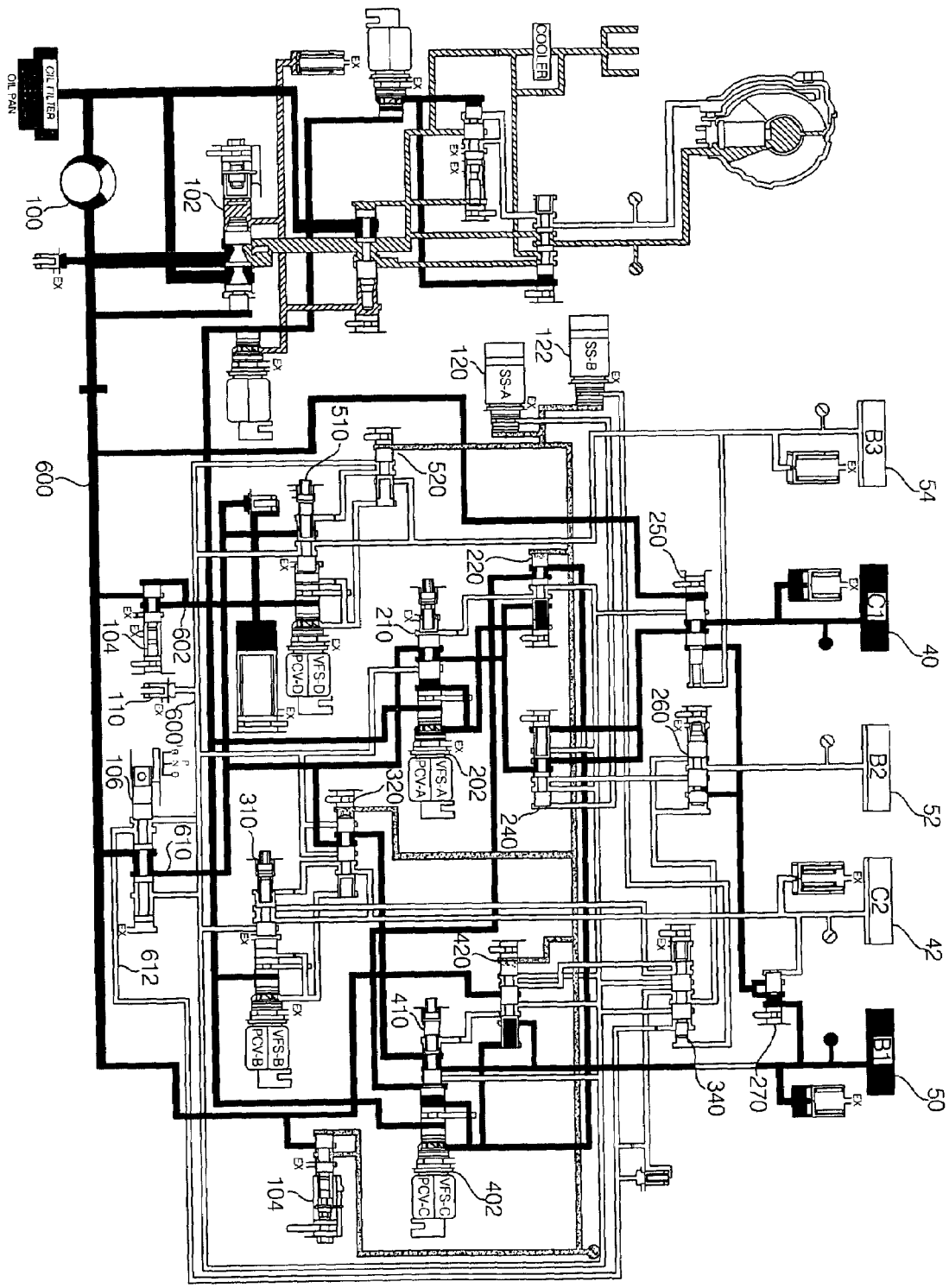
FIG. 14 is an oil pressure circuit diagram in sixth speed.

Referring to FIG. 14, upon shift command to sixth speed, power is applied to the second, third, and fourth proportional control solenoid valves 302, 402, and 502 and the first proportional control solenoid valve 202 and the first and second solenoid valves 120 and 122 are powered off.

Therefore, a control pressure of the first proportional control solenoid valve 202 is supplied to the first pressure control valve 210 and the first pressure switching valve 220 and a forward range pressure of the manual valve 106 is supplied to the first pressure control valve 210.

Then, in the first pressure control valve 210, a forward range pressure of the manual valve 106 is controlled by a fastening pressure of the first clutch 40 and the second brake 52 and a fastening pressure of the first clutch 40 and the second brake 52 controlled in the first pressure control valve 210 is delivered to the first switch valve 40.

Because the first switch valve 240 does not receive an output pressure of the first solenoid valve 120, it allows a fastening pressure of the first clutch 40 and the second brake 52 outputted in the first pressure control valve 210 to be delivered to the second switch valve 250.

Because the second switch valve 250 receives only a fastening pressure of the third brake 54, it allows a fastening pressure of the first clutch 40 and the second brake 52 outputted from the first switch valve 240 to be delivered to the first clutch 40.

Then, the first clutch 40 is operated by a fastening pressure of the first clutch 40 and the second brake 52.

At the same time, a control pressure of the third proportional control solenoid valve 402 is supplied to the third pressure control valve 410 and the third pressure switching valve 420 and a forward range pressure of the manual valve 106 is supplied to the third pressure control valve 410 through the second pressure switching valve 320.

Then, in the third pressure control valve 410, a forward range pressure of the manual valve 106 is controlled by a fastening pressure of the first brake 50 and a fastening pressure of the first brake 50 controlled in the third pressure control valve 410 is supplied to the first brake 50, so that the first brake 50 is operated by a fastening pressure of the first brake 50.

When the first clutch 40 and the first brake 50 are operated at the same time, sixth speed is embodied.

Figure 15:
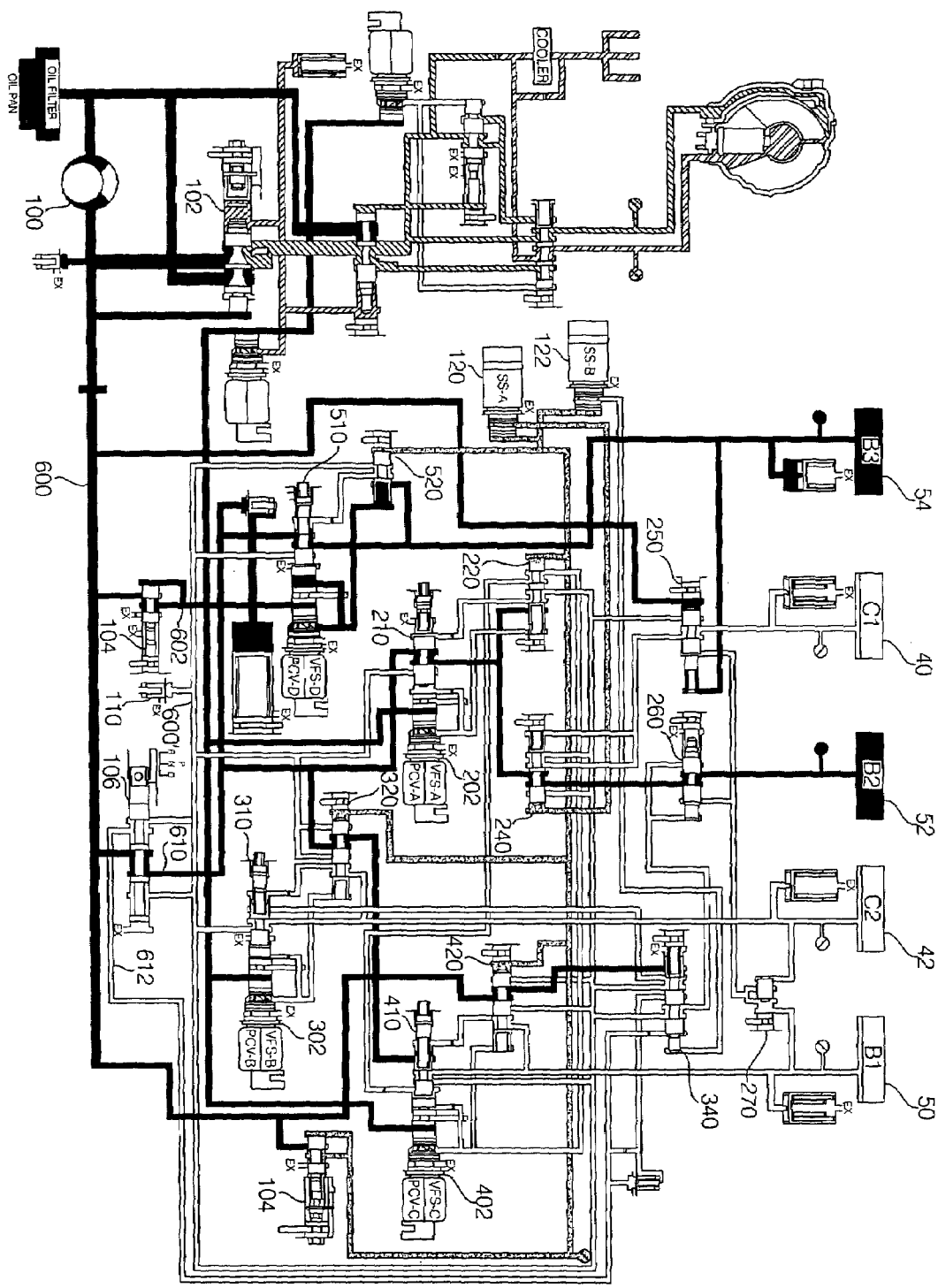
FIG. 15 is an oil pressure circuit diagram upon shifting to a low speed.

Referring to FIG. 15, upon shift command to low speed, power is applied to the second proportional control solenoid valve 302 and the first solenoid valve 120 and the first, third, and fourth proportional control solenoid valves 202, 402, and 502 and the second solenoid valve 122 are powered off.

Therefore, a control pressure of the first proportional control solenoid valve 202 is supplied to the first pressure control valve 210 and the first pressure switching valve 220.

The forward range pressure of the manual valve 106 is supplied to the first pressure control valve 210 and an output pressure of the first solenoid valve 120 is supplied to the first switch valve 240.

Then, in the first pressure control valve 210, a forward range pressure of the manual valve 106 is controlled by a fastening pressure of the first clutch 40 and the second brake 52 and a fastening pressure of the first clutch 40 and the second brake 52 controlled in the first pressure control valve 210 is delivered to the first switch valve 240.

Because the first switch valve 240 receives an output pressure of the first solenoid valve 120, it allows a fastening pressure of the first clutch 40 and the second brake 52 outputted from the first pressure control valve 210 to be delivered to the third switch valve 260.

Because the third switch valve 260 does not receive a fastening pressure of the second clutch 42 or a fastening pressure of the first brake 50, it allows a fastening pressure of the first clutch 40 and the second brake 52 outputted from the first switch valve 240 to be delivered to the second brake 52. Then, the second brake 52 is operated by a fastening pressure of the first clutch 40 and the second brake 52.

At the same time, a control pressure of the fourth proportional control solenoid valve 502 is supplied to the fourth pressure control valve 510 and the fourth pressure switching valve 520.

Then, in the fourth pressure control valve 510, a forward range pressure of the manual valve 106 is controlled by a fastening pressure of the third brake 54 and a fastening pressure of the third brake 54 controlled in the fourth pressure control valve 510 is supplied to the third brake 54, so that the third brake 54 is operated by a fastening pressure of the third brake 54.

When the second and third brakes 52 and 54 are operated at the same time, a low shift range to operate an engine brake is embodied.

If the manual valve 106 is switched to reverse at the start state, a reverse range pressure generated in the manual valve 106 is supplied through the reverse range pressure oil path 612 and a shift to reverse is performed.

Figure 16:
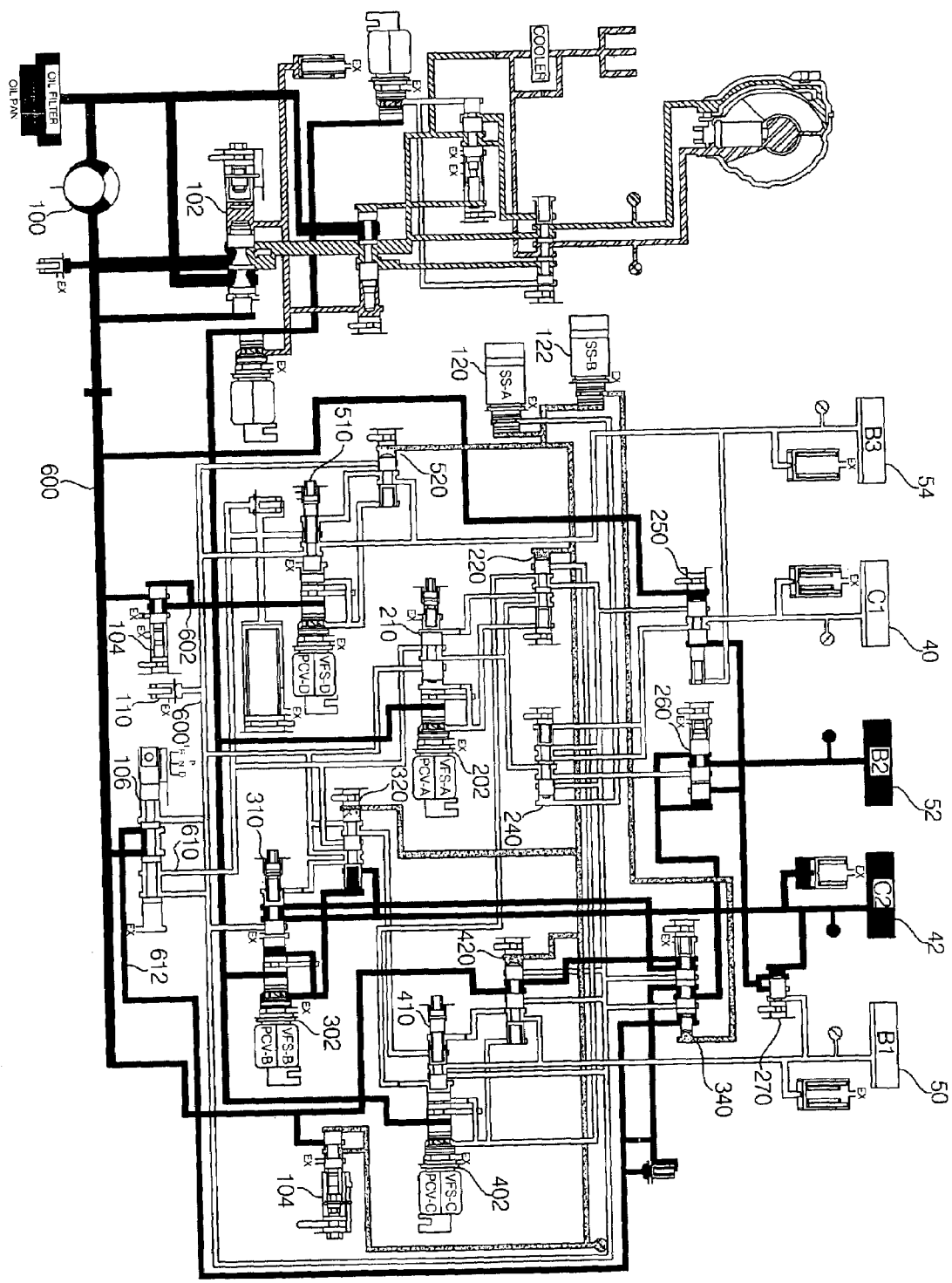
FIG. 16 is an oil pressure circuit diagram upon shifting to reverse.

Referring to FIG. 16, upon shift command to reverse, power is applied to the first and fourth proportional control solenoid valves 202 and 502 and the second solenoid valve 122 and the second and third proportional control solenoid valves 302 and 402 and the first solenoid valve 120 are powered off.

Therefore, a control pressure of the second proportional control solenoid valve 302 is supplied to the second pressure control valve 310 and the second pressure switching valve 320.

The line pressure is supplied to the fifth switch valve 340 through the third pressure switching valve 420. In addition, an output pressure of the second solenoid valve 122 is supplied to the fifth switch valve 340 and a backward range pressure of the manual valve 106 is supplied to the fifth switch valve 340.

Then, because the fifth switch valve 340 receives an output pressure of the second solenoid valve 122, a line pressure passed through the third pressure switching valve 420 is delivered to the second pressure control valve 320.

The second pressure control valve 310 controls a line pressure received through the fifth switch valve 340 with a fastening pressure of the second clutch 42. A fastening pressure of the second clutch 42 controlled in the second pressure control valve 310 is supplied to the second clutch 42. Then, the second clutch 42 is operated by a fastening pressure of the second clutch 42.

At the same time, because the fifth switch valve 340 receives a backward range pressure of the manual valve 106, it allows a backward range pressure of the manual valve 106 to be delivered to the third switch valve 260.

Because the third switch valve 260 receives a backward range pressure of the manual valve 106 through the fifth switch valve 340, a backward range pressure of the manual valve 106 is delivered to the second brake 52.

Then, the second brake 52 is operated by reverse range pressure of the manual valve 106 received through the third switch valve 260.

When the second clutch 42 and the second brake 52 are operated at the same time, a shift to reverse is embodied.

If a vehicle is at a failure state due to a failure of the first, second, third, and fourth proportional control solenoid valves 202, 302, 402, and 502, the first and second solenoid valves 120 and 122, etc., a fail safe mode is performed.

That is, referring to FIG. 13, when a vehicle fails in a forward drive state, a shift range is fixed to fourth speed because the first, second, third, and fourth proportional control solenoid valves 202, 302, 402, and 502 and the first and second solenoid valves 120 and 122 are not connected to a power source.

Specifically, as power of the first proportional control solenoid valve 202 is turned off, a fastening pressure of the first clutch 40 and the second brake 52 is formed in the first pressure control valve 210 and as power of the first solenoid valve 120 is turned off, the first switch valve 240 delivers a fastening pressure of the first clutch 40 and the second brake 52 to the second switch valve 250 and the second switch valve 250 delivers a fastening pressure of the first clutch 40 and the second brake 52 to the first clutch 40.

Then, the first clutch 40 does not operate.

As power of the second proportional control solenoid valve 302 is turned off and power of the second solenoid valve 122 is turned off, the fifth switch valve 340 does not deliver a line pressure to the second pressure control valve 310 and thus the second clutch 42 is operated.

Furthermore, as power of the third proportional control solenoid valve 402 is turned off, the first brake 50 does not operate.

Furthermore, as power of the fourth proportional control solenoid valve 502 is turned off, the fourth pressure control valve 510 forms a fastening pressure of the third brake 54 and thus the third brake 54 operates.

Therefore, upon generating of a failure during a forward travel, the first clutch 40 and the third brake 54 are operated and thus fourth speed is embodied.

Furthermore, when a vehicle stops after generating of a failure and then again travels forward, fourth speed is embodied as in generation of a failure during forward travel.

Figure 9:
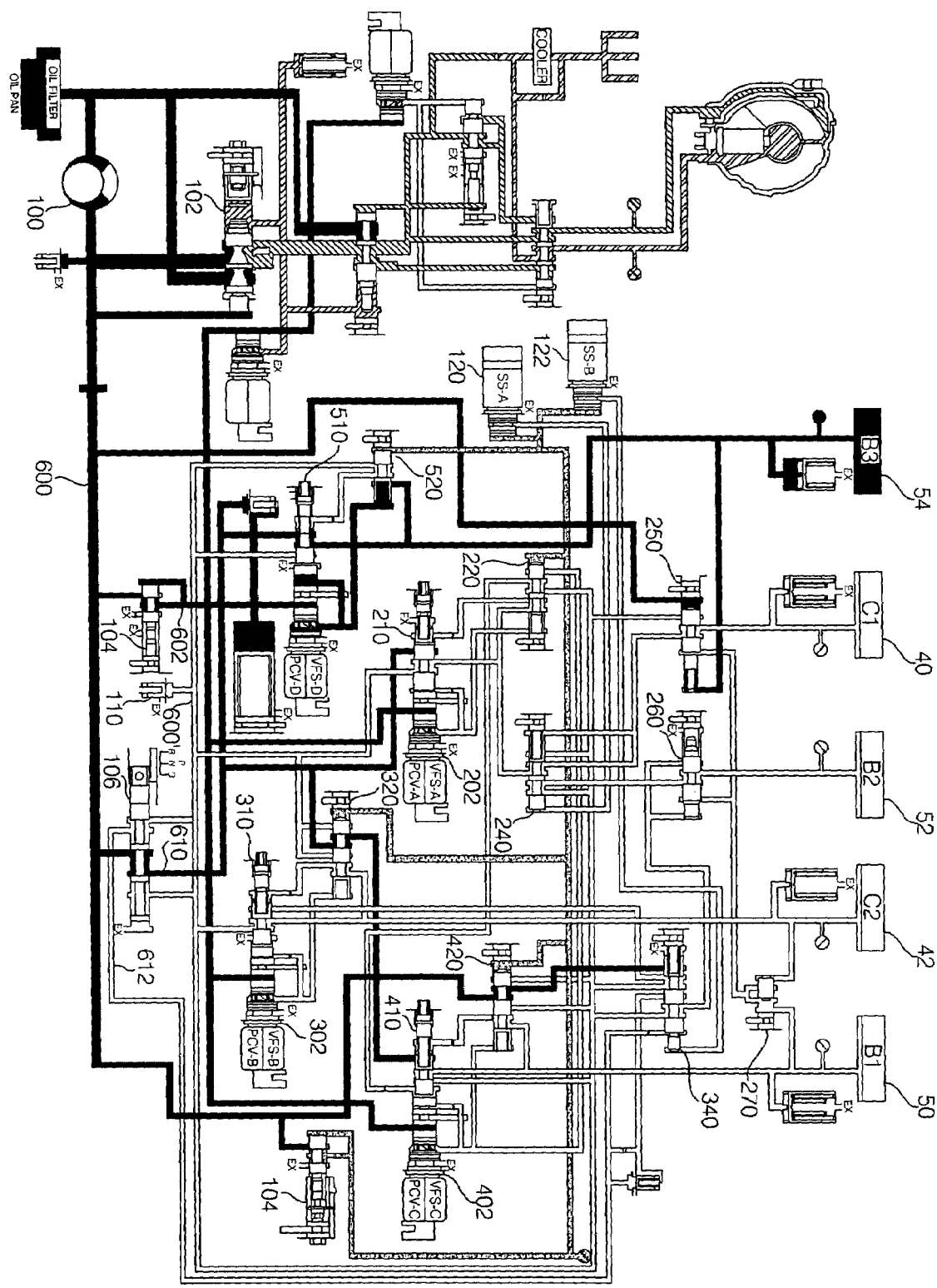
FIG. 9 is an oil pressure circuit diagram in first speed.

Furthermore, upon generating of a failure in neutral or park, referring to FIG. 9, because a forward range pressure of the manual valve 106 is not delivered to the first, third and fourth pressure control valves 210, 410, and 510, the first clutch 40 and the first, second, and third brakes 50, 52, and 54 do not operate.

In the second pressure control valve 310 using the line pressure as an input source an output pressure of the second solenoid valve 122 or a reverse range pressure of the manual valve 106 is not delivered to the fifth switch valve 340 and thus the line pressure is not delivered through the fifth switch valve 340. Thus, the second clutch 42 does also not operate and thus a neutral state is sustained.

Furthermore, referring to FIG. 17, if a vehicle fails during backward travel, because a forward range pressure of the manual valve 106 is not inputted to the first and fourth pressure control valves 210 and 510 although the first and fourth proportional control solenoid valves 202 and 502 are power off, the pressure control valve 210 does not from a fastening pressure of the first clutch 40 and the second brake 52 and the forth pressure control valve 510 does not form a fastening pressure of the third brakes 54.

Furthermore, the third proportional control solenoid valve 402 is powered off and thus the third pressure control valve 410 does not form a fastening pressure of the first brake 50.

However, as the second proportional control solenoid valve 302 is powered off and a reverse range pressure of the manual valve 106 is inputted to the fifth switch valve 340, the second pressure control valve 310 forms a fastening pressure of the second clutch 42. Therefore, the second clutch 42 operates.

At the same time, a reverse range pressure of the manual valve 106 is delivered to the third switch valve 260 through the fifth switch valve 340 and the third switch valve 260 delivers a reverse range pressure of the manual valve 106 to the second brake 52 and thus the second brake 52 operates.

Then, as described above, as the second clutch 42 and the second brake 52 operate at the same time, a next speed range is embodied.

An oil pressure control system of six speed automatic transmission according to the present invention having the above-mentioned construction embodies forward six speed, a low range, and backward one speed by including three planetary gear sets, two clutches, three brakes, and one one-way clutch, so that there are advantages in gas mileage and performance.

Furthermore, controllers of each fastening element do not independently operate, so shift performance improves, a specific shift range can be set depending on driving conditions upon generating of a failure, and thus a fail-safe mode can be improved.

That is, as the first clutch and second brake controller sustain a fastening state of the first clutch by a fastening pressure of the first clutch upon operating of the first clutch which operates in a high speed range, a high speed range can not be released due to an outside impact.

Furthermore, as the first clutch and second brake controller allow the first clutch not to receive a fastening pressure in second and third speeds, a fail-safe mode can be set in a specific shift range upon preventing of an erroneous shift and generating of a failure.

Furthermore, as the first clutch and second brake controller allow the second brake to receive a reverse range pressure of the manual valve and operate in reverse, a fail-safe mode can be set in a specific shift range upon preventing of an erroneous shift and generating of a failure.

Furthermore, as the first clutch and second brake controller allow the second brake not to receive a fastening pressure upon operating of the first brake or the second clutch, a fail-safe mode can be set in a specific shift range upon preventing of an erroneous shift and generating of a failure.

Furthermore, as the second clutch controller forms a fastening pressure of the second clutch in association with the first brake controller, a fail-safe mode can be set in a specific shift range upon preventing of an erroneous shift and generating of a failure.

Furthermore, as the first brake controller forms a fastening pressure of the first brake in association with the third brake controller, a fail-safe mode can be set in a specific shift range upon preventing of an erroneous shift and generating of a failure.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An oil pressure control system of a six speed automatic transmission with first through sixth forward speeds and a reverse speed which comprises first and second clutches, first, second, and third brakes, and first, second, and third planetary gear sets, the system comprising:
   a first clutch and second brake controller, allowing the first clutch to receive a first clutch fastening pressure in said fourth, fifth, and sixth speeds, allowing a second brake to receive a second brake fastening pressure in said first and reverse speeds, and allowing an operation state of the first clutch by the first clutch fastening pressure to be sustained upon operation of the first clutch;
   a second clutch controller allowing the second clutch to receive a second clutch fastening pressure in said third, fifth, and reverse speeds;
   a first brake controller allowing the first brake to receive a first brake fastening pressure in said second and sixth speeds; and
   a third brake controller allowing the third brake to receive a third brake fastening pressure in said first, second, third, and fourth speeds;
   wherein the first clutch and second brake controller comprises:
   a first pressure control valve controlling the first clutch fastening pressure with a control pressure of a first proportional control valve;
   a pressure switching valve feeding back the first clutch fastening pressure controlled in the first pressure control valve to the first pressure control valve;
   a first switch valve allowing the first clutch fastening pressure to be supplied to the first clutch or the second brake and allowing the first clutch fastening pressure to be unconditionally supplied to the first clutch when the first clutch is fastened, depending on an output pressure of a first valve;
   a second switch valve allowing the first clutch to selectively receive the first clutch fastening pressure depending on the second clutch fastening pressure, the third brake fastening pressure, the first brake fastening pressure, and a line pressure; and
   a third switch valve allowing the second brake to selectively receive the first clutch fastening pressure or a reverse range pressure, depending on the second clutch fastening pressure, the first brake fastening pressure, and the reverse range pressure.

2. The oil pressure control system of claim 1, wherein the first proportional control valve is a normally high type solenoid valve which outputs a maximum control pressure when power is not connected.

3. The oil pressure control system of claim 1, wherein the first proportional control valve and the first pressure control valve are divided by a plug.

4. The oil pressure control system of claim 1, wherein the first pressure control valve comprises:
   an input port inputting a forward range pressure of a manual valve;
   an output port outputting the first clutch fastening pressure;
   a first control pressure port inputting the control pressure of the first proportional control valve;
   a second control pressure port inputting an output pressure of the first pressure switching valve;
   a discharge port discharging the first clutch fastening pressure;
   a return spring; and
   a valve spool connecting the output port to the input port or the discharge port depending on a force equilibrium relation between the control pressure of the first proportional control valve, the output pressure of the first pressure switching valve, and the return spring.

5. The oil pressure control system of claim 1, wherein the first pressure switching valve comprises:
an input port inputting the first clutch fastening pressure outputted from the first pressure control valve;
an output port feeding back the first clutch fastening pressure inputted to the first pressure switching valve to the first pressure control valve;
a discharge port discharging the first clutch fastening pressure fed back to the first pressure control valve;
a first control pressure port inputting the control pressure of the first proportional control valve;
a second control pressure port inputting decompression of a reducing valve decompressing the line pressure;
a return spring; and
a valve spool connecting the output port to the input port or the discharge port depending on a force equilibrium relation between the control pressure of the first proportional control valve, the decompression of the reducing valve, and the return spring.

6. The oil pressure control system of claim 5, wherein the first pressure switching valve further comprises:
a feedback input port inputting a control pressure of the first brake controller;
a feedback output port feeding back a control pressure of the first brake controller inputted through the feedback input port to the first brake controller; and
a first brake controller feedback valve spool selectively connecting the feedback input port to the feedback output port depending on a force equilibrium relation between the control pressure of the first proportional control solenoid valve, the decompression of the reducing valve, and the return spring.

7. The oil pressure control system of claim 1, wherein the first valve is a normally low type solenoid valve which does not output an output pressure when power is not connected.

8. The oil pressure control system of claim 1, wherein the first switch valve comprises:
an input port inputting the first clutch fastening pressure outputted from the first pressure control valve;
a first output port outputting the first clutch fastening pressure inputted to the first switch valve to the second switch valve;
a second output port outputting the first clutch fastening pressure inputted to the first switch valve to the third switch valve;
a first discharge port discharging the first clutch fastening pressure outputted to the second switch valve;
a second discharge port discharging the first clutch fastening pressure outputted to the third switch valve;
a first control pressure port inputting an output pressure of the first valve;
a second control pressure port feeding back the first clutch fastening pressure outputted to the second switch valve;
a return spring; and
a valve spool selectively connecting the input port to the first output port or the second output port and connecting an output port which is not connected to the input port to the first discharge port or the second discharge port depending on a force equilibrium relation between the output pressure of the first valve, the first clutch fastening pressure outputted to the second switch valve, and the return spring.

9. The oil pressure control system of claim 1, wherein the second switch valve comprises:

an input port inputting the first clutch fastening pressure outputted from the first switch valve;
an output port outputting the first clutch fastening pressure inputted to the second switch valve to the first clutch;
a discharge port discharging a pressure outputted to the first clutch;
a first control pressure port inputting the line pressure;
a second control pressure port inputting the first brake fastening pressure or the second clutch fastening pressure;
a third control pressure port inputting the third brake fastening pressure;
a return spring; and
a valve spool connecting the output port to the input port or the discharge port depending on a force equilibrium relation between the line pressure, the third brake fastening pressure, the return spring, and the first brake fastening pressure.

10. The oil pressure control system of claim 9, wherein a second control pressure port of the second switch valve is connected to a fourth switch valve which allows the first brake fastening pressure or the second clutch fastening pressure to output to the second switch valve.

11. The oil pressure control system of claim 10, wherein the fourth switch valve comprises:
a first input port inputting the first brake fastening pressure;
a second input port inputting the second clutch fastening pressure;
an output port connecting the second switch valve and the fourth switch valve to each other; and
a valve spool connecting the output port to the first input port or the second input port depending on a force equilibrium relation between the first brake fastening pressure and the second clutch fastening pressure.

12. The oil pressure control system of claim 1, wherein the third switch valve comprises:
a first input port inputting the first clutch fastening pressure outputted from the first switch valve;
an output port outputting the first clutch fastening pressure inputted to the third switch valve to the second brake;
a switch port inputting a reverse range pressure of a manual valve or discharging a pressure outputted to the second brake;
a first control pressure port inputting the reverse range pressure of the manual valve;
a second control pressure port inputting the first brake fastening pressure or the second clutch fastening pressure;
a return spring; and
a valve spool connecting the output port to the input port or the discharge port depending on a force equilibrium relation between the reverse range pressure of the manual valve inputted to the first control pressure port, the return spring, and the first brake fastening pressure or the second clutch fastening pressure.

13. The oil pressure control system of claim 12, wherein a second control pressure port of the third switch valve is connected to a fourth switch valve which allows the first brake fastening pressure or the second clutch fastening pressure to output to the third switch valve.

14. The oil pressure control system of claim 13, wherein the fourth switch valve comprises:
a first input port inputting the first brake fastening pressure;
a second input port inputting the second clutch fastening pressure;
an output port connecting the third switch valve and the fourth switch valve to each other; and a valve spool connecting the fourth switch valve output port to the fourth switch valve first input port or the fourth switch valve second input port depending on a force equilibrium relation between the first brake fastening pressure and the second clutch fastening pressure.

15. The oil pressure control system of claim 12, wherein a switch port of the third switch valve is connected to the second clutch controller to receive the reverse range pressure of the manual valve or to discharge the second brake fastening pressure.

16. The oil pressure control system of claim 12, wherein a first control pressure port of the third switch valve is connected to the second clutch controller to receive the reverse range pressure of the manual valve.

17. The oil pressure control system of claim 1, wherein the second clutch controller comprises:
a second pressure control valve controlling the first clutch fastening pressure by a control pressure of the second proportional control valve;
a second pressure switching valve feeding back the second clutch fastening pressure controlled in the second pressure control valve to the second pressure control valve; and
a fifth switch valve selectively inputting the line pressure passed through the first brake controller to the second pressure control valve depending on an output pressure of a second valve or a reverse range pressure of a manual valve.

18. The oil pressure control system of claim 17, wherein the second proportional control valve is a normally high type solenoid valve which outputs a maximum control pressure when power is not connected.

19. The oil pressure control system of claim 17, wherein the second proportional control valve and the second pressure control valve are divided by a plug.

20. The oil pressure control system of claim 17, wherein the second pressure control valve comprises:
an input port inputting the line pressure;
an output port outputting the second clutch fastening pressure;
a first control pressure port inputting the control pressure of the second proportional control valve;
a second control pressure port inputting an output pressure of the second pressure switching valve;
a discharge port discharging the second clutch fastening pressure;
a return spring; and
a valve spool connecting the output port to the input port or the discharge port depending on a force equilibrium relation between the control pressure of the second proportional control valve, the output pressure of the second pressure switching valve, and the return spring.

21. The oil pressure control system of claim 17, wherein the second pressure switching valve comprises:
a first input port inputting the second clutch fastening pressure outputted from the second pressure control valve;
a first output port feeding back the second clutch fastening pressure inputted to the second pressure switching valve to the second pressure control valve;
a first discharge port discharging the second clutch fastening pressure fed back to the second pressure control valve;
a first control pressure port inputting the control pressure of the second proportional control valve;
a second control pressure port inputting decompression of a reducing valve decompressing the line pressure;
a return spring; and a first valve spool connecting the first output port to the first input port or the first discharge port depending on a force equilibrium relation between the control pressure of the second proportional control valve, the decompression of the reducing valve, and the return spring.

22. The oil pressure control system of claim 21, wherein the second pressure switching valve further comprises:
a second input port inputting a forward range pressure of the manual valve;
a second output port outputting the forward range pressure of the manual valve inputted to the second pressure switching valve to the first brake controller;
a second discharge port discharging the forward range pressure of the manual valve outputted to the first brake controller; and
a second valve spool connecting the second pressure switching valve second output port to the second pressure switching valve second input port or the second pressure switching valve second discharge port depending on a force equilibrium relation between the control pressure of the second proportional control valve, the decompression of the reducing valve, and the return spring.

23. The oil pressure control system of claim 17, wherein the first valve is a normally low type solenoid valve which does not output an output pressure when power is not connected.

24. The oil pressure control system of claim 17, wherein the fifth switch valve comprises:
a first input port inputting the line pressure passed through the first brake controller;
a first output port outputting the line pressure inputted to the fifth switch valve to the second pressure control valve;
a first discharge port discharging a line pressure outputted to the second pressure control valve;
a first control pressure port inputting an output pressure of a second valve;
a second control pressure port inputting the reverse range pressure of the manual valve;
a return spring; and
a first valve spool connecting the first output port to the first input port or the first discharge port depending on a force equilibrium relation between an output pressure of the first valve or the reverse range pressure of the manual valve, and the return spring.

25. The oil pressure control system of claim 24, wherein the fifth switch valve comprises:
a second input port inputting the reverse range pressure of the manual valve;
a second output port outputting the reverse range pressure of the manual valve inputted to the fifth switch valve to the first clutch and second brake controller;
a second discharge port discharging the reverse range pressure of the manual valve outputted to the first clutch and second brake controller; and
a second valve spool connecting the fifth switch valve second output port to the fifth switch valve second input port or the fifth switch valve second discharge port depending on a force equilibrium relation between the output pressure of the first valve or the reverse range pressure of the manual valve, and the return spring.

26. The oil pressure control system of claim 1, wherein the first brake controller comprises:
a third pressure control valve controlling a forward range pressure of the manual valve inputted through the second clutch controller to the first brake fastening pressure by a control pressure of a third proportional control valve; and a third pressure switching valve feeding back the first brake fastening pressure controlled in the third pressure control valve to the third pressure control valve.

27. The oil pressure control system of claim 26, wherein the third proportional control valve is a normally low type solenoid valve which does not output an output pressure when power is not connected.

28. The oil pressure control system of claim 26, wherein the third proportional control valve and the third pressure control valve are divided by a plug.

29. The oil pressure control system of claim 26, wherein the third pressure control valve comprises:

an input port inputting the forward range pressure of the manual valve;

an output port outputting the first brake fastening pressure;

a discharge port discharging the first brake fastening pressure;

a first control pressure port inputting a control pressure of the third proportional control valve;

a second control pressure port inputting an output pressure of the third pressure switching valve;

a return spring; and a valve spool connecting the output port to the input port or the discharge port depending on a force equilibrium relation between the control pressure of the third proportional control valve, the output pressure of the third pressure switching valve, and the return spring.

30. The oil pressure control system of claim 26, wherein the third pressure switching valve comprises:

a first input port inputting the first brake fastening pressure outputted from the third pressure control valve;

a first output port feeding back the first brake fastening pressure inputted to the third pressure switching valve to the third pressure control valve;

a first discharge port discharging the first brake fastening pressure fed back to the third pressure control valve;

a first control pressure port inputting the control pressure of the third proportional control valve;

a second control pressure port inputting decompression of a reducing valve decompressing the line pressure;

a return spring; and a first valve spool connecting the first output port to the first input port or the first discharge port depending on a force equilibrium relation between the control pressure of the third proportional control valve, the decompression of the reducing valve, and the return spring.

31. The oil pressure control system of claim 30, wherein the third pressure switching valve further comprises:

a second input port inputting the line pressure;

a second output port outputting the line pressure inputted to the third pressure switching valve to the second clutch controller;

a second discharge port discharging the line pressure outputted to the second clutch controller; and a second valve spool connecting the second output port to the second input port or the second discharge port depending on a force equilibrium relation between the control pressure of the third proportional control valve, the decompression of the reducing valve, and the return spring.

32. The oil pressure control system of claim 1, wherein the third brake controller comprises:

a fourth pressure control valve controlling a forward range pressure of the manual valve with the third brake fastening pressure by an output pressure of the fourth proportional control valve; and a fourth pressure switching valve feeding back the third brake fastening pressure controlled in the fourth pressure control valve to the fourth pressure control valve.

33. The oil pressure control system of claim 32, wherein the fourth proportional control valve is a normally high type solenoid valve which outputs a maximum control pressure when power is not connected.

34. The oil pressure control system of claim 32, wherein the fourth proportional control valve and the fourth pressure control valve are divided by a plug.

35. The oil pressure control system of claim 32, wherein the fourth pressure control valve comprises:

an input port inputting the forward range pressure of the manual valve;

an output port outputting the third brake fastening pressure;

a discharge port discharging the third brake fastening pressure;

a first control pressure port inputting a control pressure of the fourth proportional control valve;

a second control pressure port inputting an output pressure of the fourth pressure switching valve;

a return spring; and a valve spool connecting the output port to the input port or the discharge port depending on a force equilibrium relation between the control pressure of the fourth proportional control valve, the output pressure of the fourth pressure switching valve, and the return spring.

36. The oil pressure control system of claim 32, wherein the fourth pressure switching valve comprises:

an input port inputting the third brake fastening pressure outputted from the fourth pressure control valve;

an output port feeding back the third brake fastening pressure inputted to the fourth pressure switching valve to the fourth pressure control valve;

a discharge port discharging the third brake fastening pressure fed back to the fourth pressure control valve;

a first control pressure port inputting a control pressure of the fourth proportional control valve;

a second control pressure port inputting decompression of a reducing valve decompressing the line pressure;

a return spring; and a valve spool connecting the output port to the input port or the discharge port depending on a force equilibrium relation between the control pressure of the fourth proportional control valve, the decompression of the reducing valve, and the return spring.

* * * * *